(12) United States Patent
Beltrone et al.

(10) Patent No.: US 12,489,722 B2
(45) Date of Patent: Dec. 2, 2025

(54) DYNAMIC MEMORY ARCHITECTURE FOR USE WITH LARGE LANGUAGE MODEL(S)

(71) Applicant: GOOGLE LLC, Mountain View, CA (US)

(72) Inventors: Lauren Beltrone, New York, NY (US); Jackson Tolins, San Franciso, CA (US); Maria Parra, New York, NY (US); Carla Echevarria, New York, NY (US); Carsten Isert, Zurich (CH); Patrick Zöchbauer, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 78 days.

(21) Appl. No.: 18/540,373

(22) Filed: Dec. 14, 2023

(65) Prior Publication Data

US 2025/0202842 A1    Jun. 19, 2025

(51) Int. Cl.
*H04L 51/02* (2022.01)
*G06F 40/35* (2020.01)

(52) U.S. Cl.
CPC .............. *H04L 51/02* (2013.01); *G06F 40/35* (2020.01)

(58) Field of Classification Search
None
See application file for complete search history.

(56) References Cited

U.S. PATENT DOCUMENTS

| | | | | |
|---|---|---|---|---|
| 11,270,082 | B2* | 3/2022 | Seegan | G06F 40/40 |
| 11,341,339 | B1* | 5/2022 | Li | G06F 40/40 |
| 2018/0131645 | A1* | 5/2018 | Magliozzi | G06F 40/30 |
| 2019/0034828 | A1* | 1/2019 | Cagadas | H04L 51/02 |
| 2019/0217206 | A1* | 7/2019 | Liu | G06N 3/006 |
| 2019/0272296 | A1* | 9/2019 | Prakash | G06F 16/24534 |
| 2019/0311036 | A1* | 10/2019 | Shanmugam | G06F 40/56 |
| 2019/0361977 | A1* | 11/2019 | Crudele | G06F 40/284 |

(Continued)

FOREIGN PATENT DOCUMENTS

CA      3142624 A1    12/2020

OTHER PUBLICATIONS

European Patent Office; International Search Report and Written Opinion issued in Application No. PCT/US2024/058085; 11 pages; dated Mar. 3, 2025.

*Primary Examiner* — Peter Vincent Agustin
(74) *Attorney, Agent, or Firm* — Gray Ice Higdon

(57) ABSTRACT

Processor(s) can receive a first natural language (NL) based input as part of a dialog between a user of a client device and an automated assistant that is accessible at the client device; process, using a first machine learning (ML) model, the first NL based input to generate a first inference associated with the user and a confidence indicator for the first inference, the confidence indicator for the first inference indicative of a degree of confidence that the first inference is true; store the first inference and the confidence indicator for the first inference in a database; process, using a second ML model, the first inference and additional data to generate a modified confidence indicator for the first inference and store the modified confidence indicator in the database; and determine, based at least on the modified confidence indicator for the first inference, whether to process, using a first large language model (LLM), the first inference with a second NL based input to generate a first NL based response.

20 Claims, 10 Drawing Sheets

(56) References Cited

U.S. PATENT DOCUMENTS

| | | | | |
|---|---|---|---|---|
| 2020/0320984 | A1* | 10/2020 | Kuczmarski | G06N 20/00 |
| 2021/0144107 | A1* | 5/2021 | Liang | G06N 5/04 |
| 2021/0382925 | A1* | 12/2021 | Fincun | G06F 40/35 |
| 2022/0050968 | A1* | 2/2022 | Xie | H04L 51/02 |
| 2022/0284049 | A1 | 9/2022 | Christensen | |
| 2023/0135179 | A1* | 5/2023 | Mielke | G06N 5/022 |
| | | | | 704/232 |
| 2023/0401203 | A1* | 12/2023 | Obeidi | G06F 16/248 |
| 2023/0412469 | A1* | 12/2023 | Ramaswamy | H04W 24/08 |
| 2024/0184988 | A1* | 6/2024 | Sridhar | G06F 16/36 |
| 2025/0202842 | A1* | 6/2025 | Beltrone | H04L 51/02 |

* cited by examiner

DYNAMIC MEMORY ARCHITECTURE FOR USE WITH LARGE LANGUAGE MODEL(S)

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components for interpreting and responding to natural language (NL) based inputs received during a dialog. Large language models (LLMs) are particular types of machine learning models that are trained on enormous amounts of diverse data and that can perform various natural language processing (NLP) tasks. Recent developments have integrated aspects of LLMs into this pipeline of components for interpreting and responding to the NL based inputs. Generally, a dialog with an automated assistant that is integrated with aspects of LLMs is initiated by a user providing a NL based input, and the automated assistant can generate a response to the NL based input using the aforementioned pipeline of components.

It may be desirable for the automated assistant to memorize information ascertained from one or more previous dialogs with the user and use that memorized information to assist with generating one or more subsequent responses. For example, where a user has previously provided an NL based input including the phrase "I enjoy hiking" during a dialog with the automated assistant, it may be desirable for the automated assistant to remember that the user enjoys hiking so that the automated assistant may utilize that information to generate a response at a later point in time, such as when responding to a subsequent NL based input of "Help me plan a week vacation in Montana" during a subsequent dialog with the user. The subsequent dialog may, for example, occur one or more days, weeks or months after the user informed the automated assistant that they enjoy hiking.

In some instances, an LLM can itself memorize information ascertained from a dialog with a user. However, this memorization may be highly transitory (i.e., the information may be retained by the LLM for only a short period of time, for example a few seconds or minutes, and may not be available for use in subsequent dialogs, due to erasure of the information). Furthermore, the circumstances under which information is memorized and utilized by the LLM may be unpredictable. For example, it may be difficult to predict which piece of information from an NL based input the LLM will memorize, if at all, and how the LLM may subsequently use that memorized information.

Additionally or alternatively, in some instances information obtained during one or more dialogs with an automated assistant may be stored in a database such as a knowledge graph, which may be external to the LLM in the pipeline of components. The information may be stored in the database for later utilization in generating an NL based response. However, such methods of memorization using a database may also have various limitations. For instance, the automated assistant may require a particularly high threshold for determining whether information should be memorized. As an example, the automated assistant may only memorize information that has been determined to be factually correct with a high degree of certainty (e.g., where the user has clearly presented the information as a fact, such as "I live in London"). The high threshold may have been utilized to prevent the memorization (and therefore subsequent utilization) of information that is potentially irrelevant or untrue. Such methods of memorization using a database may also lack flexibility, with information being rigidly maintained in memory once memorized by the automated assistant. For example, once the automated assistant has memorized a certain piece of information, that information may be maintained in memory even if it later becomes apparent (e.g., from subsequent dialogs) that the information is inaccurate. If the automated assistant utilizes the inaccurate information stored in memory to generate a response during a later dialog, the response is likely to be considered undesirable by the user. As such, the user therefore may provide one or more follow-up NL based inputs in an attempt to solicit a more desirable response from the automated assistant, which may increase the overall use of computational resources by the automated assistant and LLM and be undesirable for the user. Accordingly, there is a need in the art to better control the memorization of information ascertained during dialogs involving LLM(s).

SUMMARY

Implementations described herein are directed to an automated assistant that leverages an inference generator to generate one or more inferences based on a natural language (NL) based input(s) provided by a user to a client device, and an inference reconciler to dynamically modify a confidence indicator of those inference(s) as additional information is provided to the assistant, wherein the confidence indicator is indicative of a degree of confidence that the inference is true. Generated inferences and their associated confidence indicators may be stored in a database and can be utilized to control a large language model (LLM) for generating an NL based response.

For example, processor(s) can receive a first natural language (NL) based input as part of a dialog between a user of a client device and an automated assistant that is accessible at the client device; process, using a first machine learning (ML) model, the first NL based input to generate a first inference associated with the user and a confidence indicator for the first inference, the confidence indicator for the first inference indicative of a degree of confidence that the first inference is true; and store the first inference and the confidence indicator for the first inference in a database.

Further, the processor(s) can process, using a second ML model, the first inference and additional data to generate a modified confidence indicator for the first inference, the modified confidence indicator for the first inference being indicative of a degree of confidence that the first inference is true based on the first inference and the additional data; store the modified confidence indicator for the first inference in the database in association with the first inference; and determine, based at least on the modified confidence indicator for the first inference stored in the database, whether to process, using a first large language model (LLM), the first inference with a second NL based input to generate a first NL based response.

As used herein, an "inference" may include a theory or observation associated with the user. Some non-limiting examples of NL inferences may include "User likes swimming", "User lives in Beijing", "User walks to work", or "User dislikes spicy food". For example, an inference of "User likes sailing" may be generated based on processing an NL based input of "Where are the best locations in New England to go sailing?". While it is generally described herein that the inference is associated with the user (i.e. the user that provides the NL based input), it should be noted that in some examples the inference may be associated with a different entity than the user, such as an entity implicitly or explicitly referenced in the NL based input. As an example, an inference of "Sarah enjoys travelling" may be generated based on processing an NL based input of "Sarah visited seven different countries last year", where Sarah is the entity referenced in the NL based input, and the NL based input was provided by a user that is not Sarah.

As used herein, a "confidence indicator" associated with a particular inference is indicative of a degree of confidence that the particular inference is true (e.g. valid). In some implementations, the confidence indicator may be a confidence score. Where the confidence indicator has been generated based on data, the confidence indicator may be indicative of a degree of confidence that the particular inference is true based on that data. For example, where the confidence indicator for a particular inference has been generated based on a NL based input, the confidence indicator may be indicative of a degree of confidence that the particular inference is true based on that NL based input. As another example, where the confidence indicator for a particular inference has been generated based on that particular inference and a previous inference, the confidence indicator may be indicative of a degree of confidence that the particular inference is true based on the particular inference and the previous inference. As yet another example, where a modified confidence indicator for a particular inference has been generated based on the particular inference, a confidence indicator for the particular inference, a previous inference and a confidence indicator for the previous inference, the confidence indicator may be indicative of a degree of confidence that the particular inference is true based on the particular inference, the confidence indicator for the particular inference, the previous inference and the confidence indicator for the previous inference.

By using techniques described herein, one or more technical advantages can be achieved. As one non-limiting example, the techniques described herein enable the automated assistant to generate an inference associated with a user and to modify a confidence indicator associated with the inference over one or more iterations, taking into account additional data (such as one or more other inferences and/or confidence indicators) with each iteration. The confidence indicator is indicative of a degree of confidence that the inference is true. Accordingly, by dynamically modifying the confidence indicator, for example as new information is presented to the automated assistant that supports or contradicts the inference, changes in the degree of confidence that the inference is true can be recorded and taken into account when subsequently deciding whether to use the inference in generating a NL based response for a subsequent NL based input. Accordingly, the likelihood of the NL based response being responsive to the user's subsequent NL based input can be improved, which can thereby reduce the likelihood of the user providing one or more follow-up NL based inputs in an attempt to solicit a more pertinent NL based response.

As another non-limiting example, the techniques described herein may enable an automated assistant to generate a new inference associated with a user based on processing one or more previously-generated inferences, wherein the new inference may not have been obvious to generate based on processing a previously-received NL based input alone. Accordingly, one or more techniques described herein may allow for more numerous and more accurate inferences to be generated which, when used to generate an NL based response, can improve the likelihood of the NL based response being responsive to a user's NL based input.

As used herein, a "dialog" may include a logically-self-contained exchange between a user and automated assistant (and in some cases, other human participants). The automated assistant may differentiate between multiple dialogs with the user based on various signals, such as passage of time between dialogs, change of user context (e.g., location, before/during/after a scheduled meeting, etc.) between dialogs, detection of one or more intervening interactions between the user and the client device other than dialogs between the user and the automated assistant (e.g., the user switches applications for a while, the user walks away from then later returns to a standalone voice-activated product), locking/sleeping of the client device between dialogs, change of client devices used to interface with the automated assistant, and so forth. As used herein, a "turn" of a dialog may include an input provided by a user during a dialog. In some implementations, the turn of the dialog may be limited to the input provided by the user, whereas in other implementations, the turn of the dialog may include a prior response provided by the automated assistant to which the input provided by the user is responsive and/or a subsequent response provided by the automated assistant that is responsive to the input provided by the user.

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

DETAILED DESCRIPTION

Figure 1:
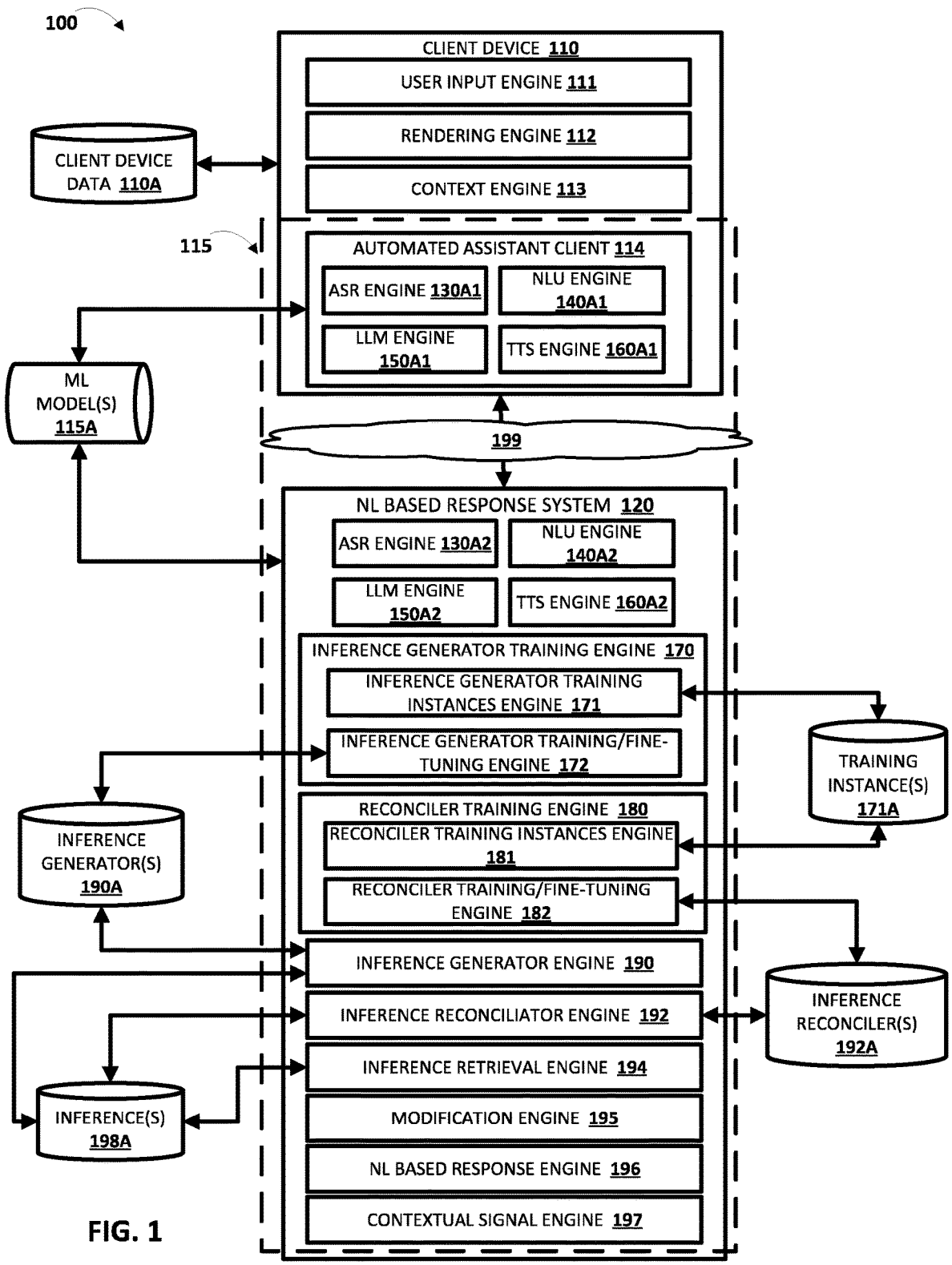
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and an NL based response system 120. In some implementations, the NL based response system 120 can be implemented locally at the client device 110. In additional or alternative implementations, the NL based response system 120 can be implemented remotely from the client device 110 as depicted in FIG. 1 (e.g., at remote server(s)). In these implementations, the client device 110 and the NL based response system 120 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the NL based response system 120 implemented locally at the client device 110 or via one or more of the networks 199 as depicted in FIG. 1. The automated assistant client 114 (and optionally by way of its interactions with other remote system (e.g., server(s)) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the NL based response system 120. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or executing remotely at one or more remote servers that may implement the NL based response system 120.

In various implementations, the client device 110 may include a user input engine 111 that is configured to detect natural language (NL) based input provided by a user of the client device 110 and/or other user inputs using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to render content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

In various implementations, the client device 110 may include a context engine 113 that is configured to determine a context (e.g., current or recent context) of the client device 110, of a user of the client device 110 (e.g., an active user of the client device 110 when the client device 110 is associated with multiple users), and/or of a dialog between the user of the client device 110 and the automated assistant 115. In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113. For example, the context engine 113 can determine a current context based on a current state of a dialog (e.g., considering one or more recent turns of the dialog), profile data, and/or a current location of the client device 110. A context determined by the context engine 113 can be utilized, for example, in supplementing or rewriting NL based input detected at the client device 110 (e.g., via the user input engine 111), or being processed with an inference using an inference generator as described herein.

Further, the client device 110 and/or the NL based response system 120 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

In some implementations, the operations performed by the automated assistant 115 may be implemented locally at the client device 110 via the automated assistant client 114. As shown in FIG. 1, the automated assistant client 114 may include an automatic speech recognition (ASR) engine 130A1, a natural language understanding (NLU) engine 140A1, a large language model (LLM) engine 150A1, and a text-to-speech (TTS) engine 160A1. In some implementations, the operations performed by the automated assistant 115 may be distributed across multiple computer systems, such as when the NL based response system 120 is implemented remotely from the client device 110 as depicted in FIG. 1. In these implementations, the automated assistant 115 may additionally or alternatively utilize one or more of ASR engine 130A2, NLU engine 140A2, LLM engine 150A2, and TTS engine 160A2 of the NL based response system 120.

Each of these engines may be configured to perform one or more functions. For example, the ASR engine 130A1 and/or 130A2 can process, using ASR model(s) stored in machine learning (ML) model(s) database 115A (e.g., a recurrent neural network (RNN) model, a transformer model, and/or any other type of ML model capable of performing ASR), a stream of audio data that captures spoken utterance(s) as NL based input and that is generated by microphone(s) of the client device 110 to generate ASR output. Notably, in some implementations, the ASR model can be utilized to generate the ASR output as the audio data is generated (e.g., a streaming ASR model). Further, the NLU engine 140A1 and/or 140A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output (or other NL based input, such as typed input) to generate NLU output. Moreover, the automated assistant 115 can cause the NLU output to be processed to generate fulfillment data. For instance, the automated assistant 115 can transmit one or more structured requests to one or more first-party (1P) systems and/or one or more third-party (3P) systems, and receive fulfillment data from one or more of the 1P systems and/or 3P systems to generate the fulfillment data. The one or more structured requests can be generated based on, for example, the NLU data, and the fulfillment data can correspond to, for example, an NL based response that is responsive to the spoken utterance(s) captured in the audio data processed by the ASR engine 130A1 and/or 130A2 (or other NL based input, such as typed input), one or more actions be performed by the automated assistant 115 based on the spoken utterance(s) captured in the audio data processed by the ASR engine 130A1 and/or 130A2, or other NL based input and/or other fulfillment output.

Moreover, the TTS engine 160A1 and/or 160A2 can process, using TTS model(s) stored in the ML model(s) database 115A, an NL based response (e.g., text formulated by the automated assistant 115) to generate synthesized speech audio data that includes computer-generated synthesized speech capturing the NL based response. In some implementations where the TTS engine 160A1 and/or 160A2 is utilized to process the NL based response, the TTS engine 160A1 and/or 160A2 can generate the synthesized speech using one or more prosodic properties to reflect a NL based style. Notably, the ML model(s) stored in the ML model(s) database 115A can be on-device ML models that are stored locally at the client device 110 or shared ML models that are accessible to both the client device 110 and/or remote systems when the NL based response system 120 is not implemented locally at the client device 110.

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, one or more corresponding predicted values (e.g., probabilities, log likelihoods, and/or other values) for each of the plurality of phonemes, and/or other ASR output. In some versions of those implementations, the ASR engine 130A1 and/or 130A2 can select one or more of the speech hypotheses as recognized text that corresponds to the spoken utterance(s) (e.g., based on the corresponding predicted values for each of the speech hypotheses), such as when the ASR engine 160A1 and/or 130A2 utilizes an end-to-end ASR model. In other implementations, the ASR engine 130A1 and/or 130A2 can select one or more of the predicted phonemes (e.g., based on the corresponding predicted values for each of the predicted phonemes), and determine recognized text that corresponds to the spoken utterance(s) based on the one or more predicted phonemes that are selected, such as when the ASR engine 160A1 and/or 130A2 utilizes an ASR model that is not end-to-end. In these implementations, the ASR engine 130A1 and/or 130A2 can optionally employ additional mechanisms (e.g., a directed acyclic graph) to determine the recognized text that corresponds to the spoken utterance(s) based on the one or more predicted phonemes that are selected.

In various implementations, the NLU output can include, for example, annotated recognized text that includes one or more annotations of the recognized text for one or more (e.g., all) of the terms of the recognized text. For example, the NLU engine 140A1 and/or 140A2 may include a part of speech tagger (not depicted) configured to annotate terms with their grammatical roles. Additionally, or alternatively, the NLU engine 140A1 and/or 140A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 140A1 and/or 140A2 may include a coreference resolver (not depicted) configured to group, or "cluster," references to the same entity based on one or more contextual cues. For example, the coreference resolver may be utilized to resolve the term "them" to "buy theatre tickets" in the NL based input "buy them", based on "theatre tickets" being mentioned in a client device notification rendered immediately prior to receiving input "buy them". In some implementations, one or more components of the NLU engine 140A1 and/or 140A2 may rely on annotations from one or more other components of the NLU engine 140A1 and/or 140A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the automated assistant 115 can additionally, or alternatively, utilize an LLM (e.g., stored in the ML model(s) database 115A) in generating an NL based response that is responsive to the NL based input. For example, the NLU engine 140A1 and/or 140A2 can optionally be omitted, and the LLM engine 150A1 and/or 150A2 can be utilized to process the recognized text generated by the ASR engine 130A1 and/or 130A2 and/or other NL based input (e.g., typed input that is directed to the automated assistant 115), and optionally other data as described herein. Also, for example, in implementations where the NL based input is non-speech based (e.g., the NL based input is typed input), the ASR engine 130A1 and/or 130A2 and the NLU engine 140A1 and/or 140A2 can optionally be omitted, and the LLM engine 150A1 and/or 150A2 can be utilized to process the NL based input. Accordingly, it should be understood that the LLM engine 150A1 and/or 150A2 can be implemented independent of any output generated by various other engines depicted in FIG. 1 (e.g., independent of any ASR output generated using the ASR engine 130A1 and/or 130A2 and/or independent of any NLU output generated using the NLU engine 140A1 and/or 140A2).

As depicted in FIG. 1, the NL based response system 120 can include an inference generator training engine 170, a reconciler training engine 180, an inference generator engine 190, an inference reconciler engine 192, an inference retrieval engine 194, a modification engine 195, an NL based response engine 196 and a contextual signal engine 197. These various engines of the NL based response system 120 can include sub-engines. For example, the inference generator training engine 170 can include an inference generator training instances engine 171 and an inference generator training/fine-tuning engine 172. Also, for example, the reconciler training engine 180 can include a reconciler training instances engine 181 and a reconciler training/fine-tuning engine 182. Although particular engines and sub-engines are depicted in FIG. 1, it should be understood that is for the sake of example and to illustrate aspects of techniques described herein, and is not meant to be limiting. For example, various engines and/or sub-engines can be added, combined, and/or omitted.

Further, the client device 110 and the NL based response system 120 are illustrated in FIG. 1 as interfacing with various databases, such as client device data database 110A, machine learning (ML) model(s) database 115A, training instance(s) database 171A, inference generator(s) database 190A, inference reconciler(s) database 192A and inference(s) database 198A. Although particular systems, engines and/or sub-engines are depicted as having access to particular databases, it should be understood that is for the sake of example and is not meant to be limiting. For instance, in some implementations, each of the various engines and/or sub-engines of the client device 110 and/or NL based response system 120 can have access to each of the various databases. Further, some of these databases can be combined and/or omitted in various implementations. Further, some of these databases can be wholly or partly comprised in the client device 110 and/or the NL based response system 120. Accordingly, it should be understood that the various databases interfacing with the client device 110 and/or NL based response system 120 illustrated in FIG. 1 are depicted for the sake of describing certain data that is accessible to the client device 110 and/or NL based response system 120 and is not meant to be limiting.

Figure 2:
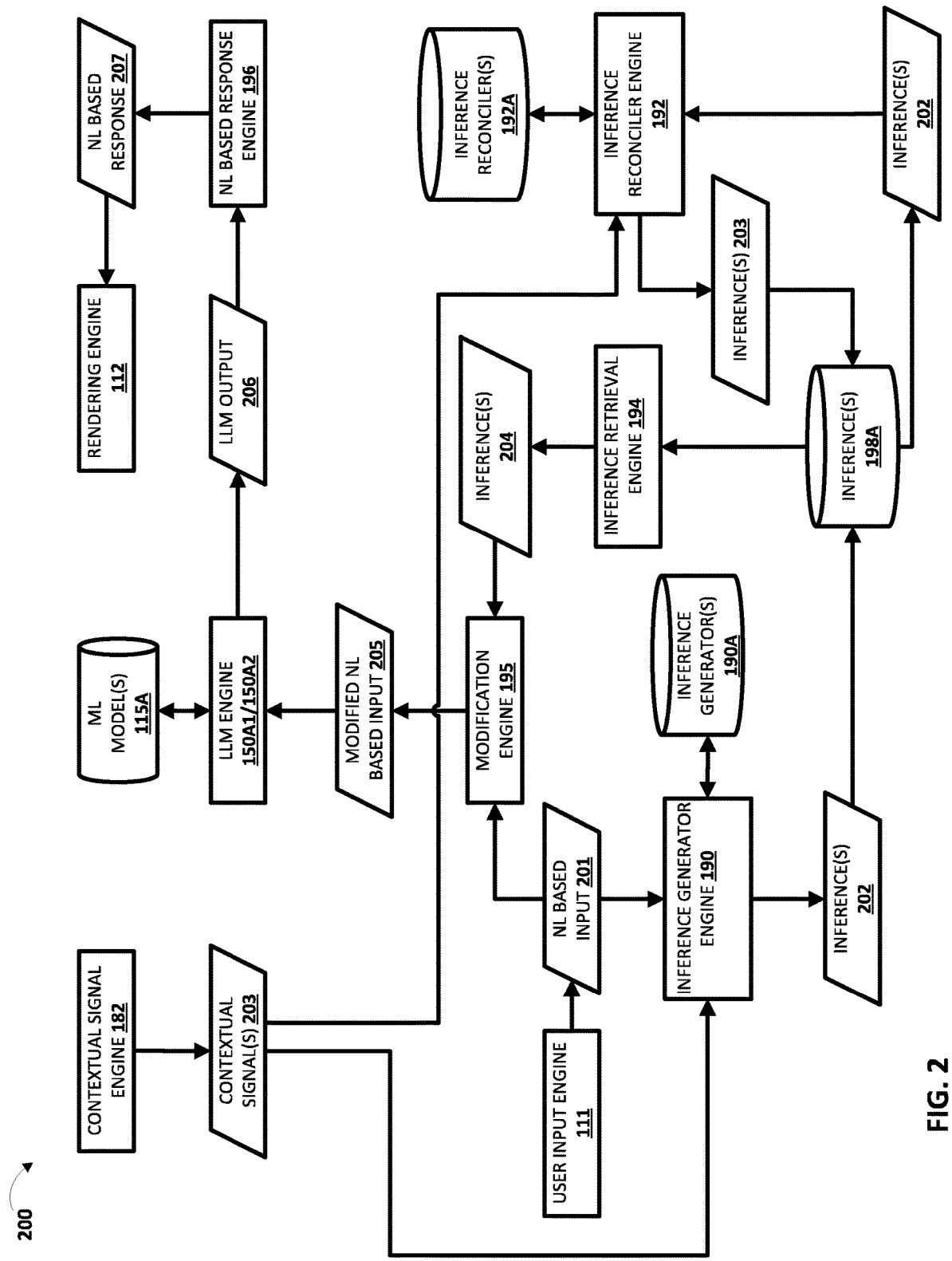
FIG. 2 depicts an example process flow of utilizing an inference generator and an inference reconciler to generate inferences, wherein the inferences can be utilized in the generation of an NL based response, in accordance with various implementations.
Figure 5:
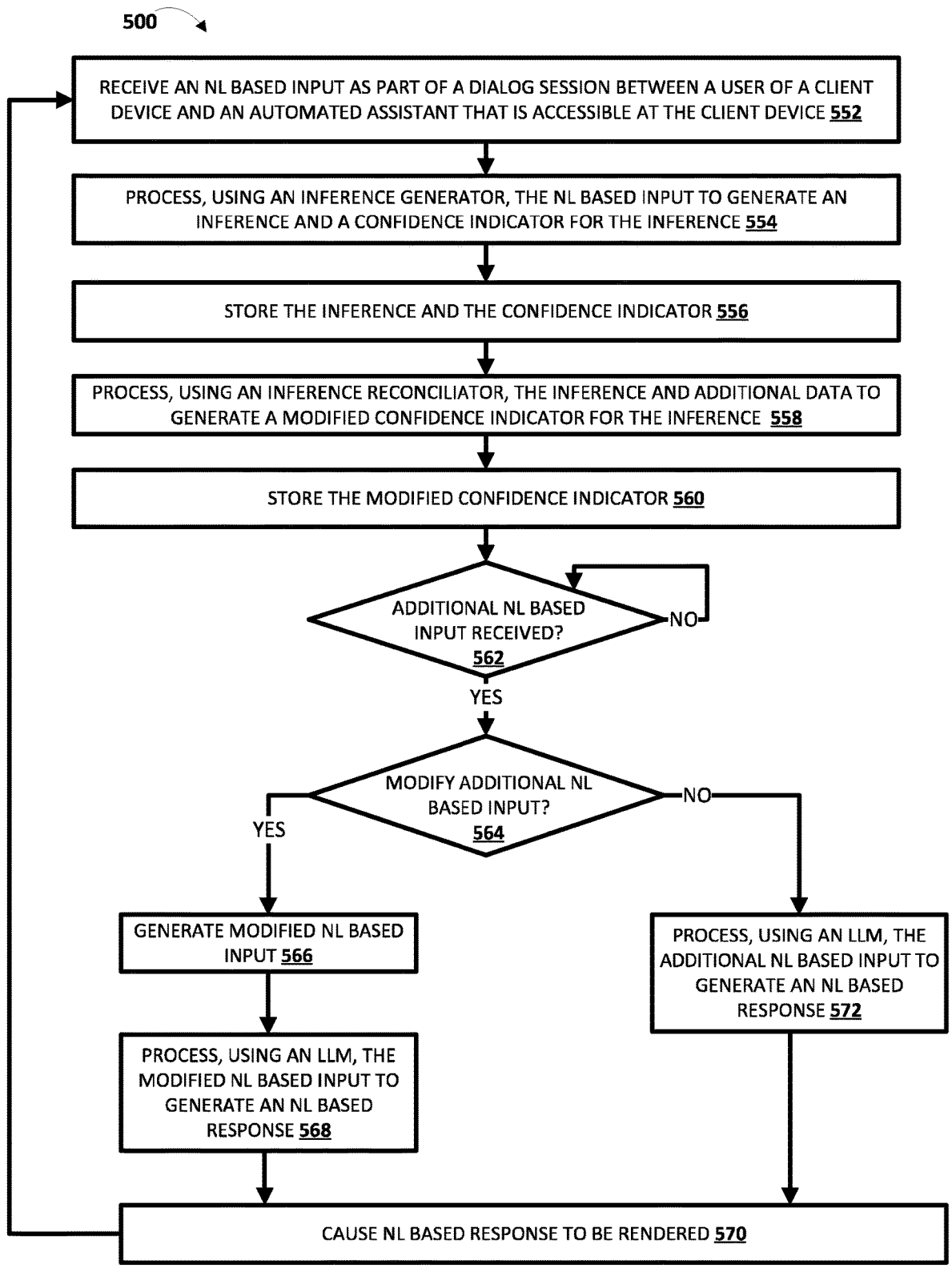
FIG. 5 depicts a flowchart illustrating an example method of utilizing an inference generator and an inference reconciler, in accordance with various implementations.
Figure 6:
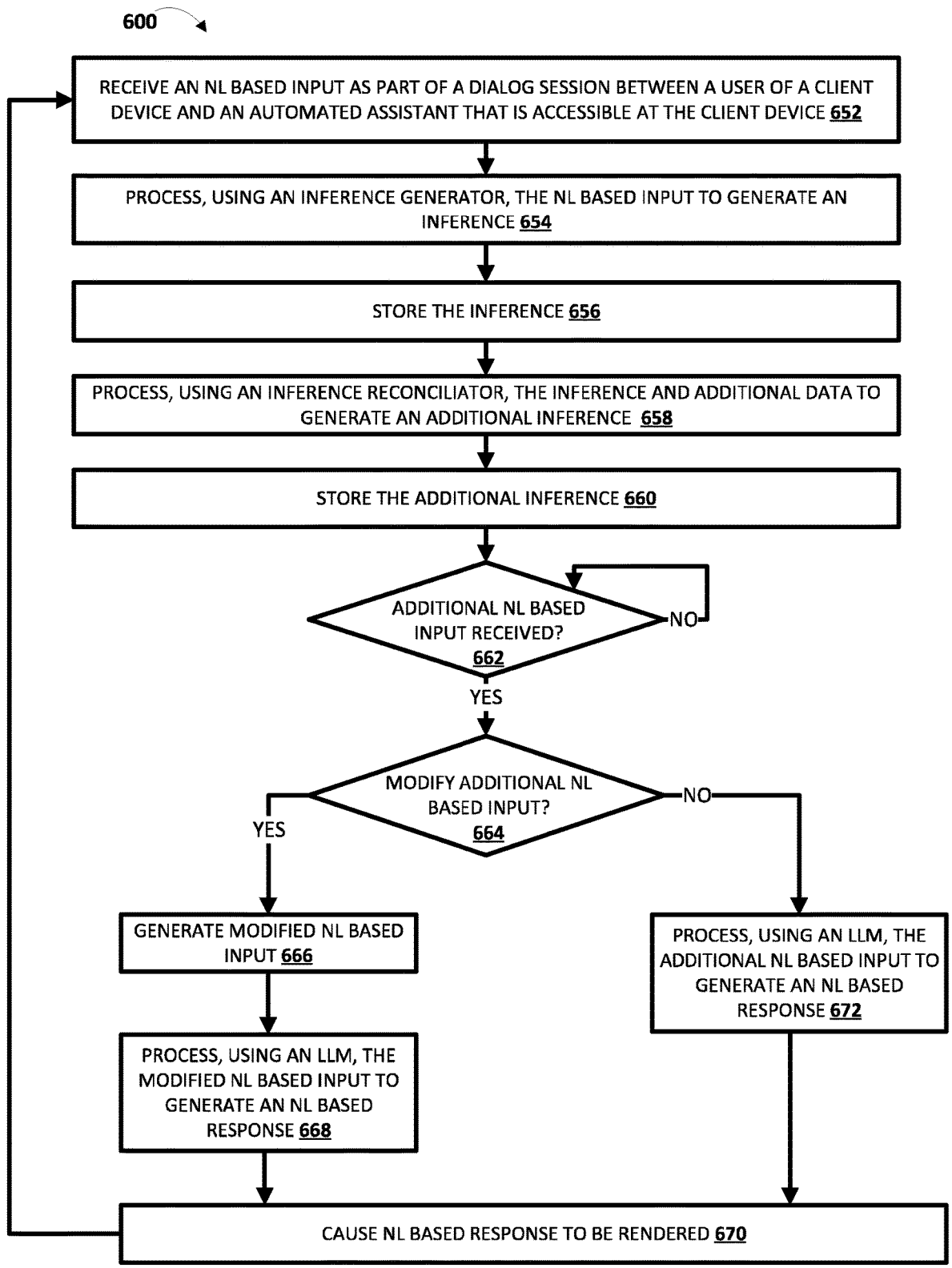
FIG. 6 depicts a flowchart illustrating a further example method of utilizing an inference generator and an inference reconciler, in accordance with various implementations.

Notably, the automated assistant 115 can utilize the inference generator engine 190 to process, using an inference generator (e.g., stored in the inference generator(s) database 190A), an NL based input provided as part of a dialog between a user of the client device 110 and the automated assistant 115 to generate one or more inferences (and, in some implementations, a corresponding confidence indicator for each inference), and store the generated inference(s) (and corresponding confidence indicator(s), where generated) in an inference(s) database 198A for later utilization in generating NL based response(s) (e.g., as described in relation FIGS. 2, 5 and 6).

The inference generator may comprise any suitable machine learning (ML) model(s) (e.g. stored in the ML model(s) database 115A) that is capable of processing a received NL based input to generate one or more inferences as output (and, in some instances, a corresponding confidence indicator for each inference). In some instances, the inference generator may comprise an LLM, for example, the LLM may be LaMDA, BERT, BARD, Meena, PaLM, GPT-3, GPT-4, and/or any other LLM, such as any other LLM that is encoder-only based, decoder-only based, sequence-to-sequence based and that optionally includes an attention mechanism or other memory. In some instances, the inference generator may comprise an ML classifier model. The inference generator (e.g., the inference generator ML model(s)) may have been trained to generate one or more inferences as output (and, in some instances, a corresponding confidence indicator for each inference), (e.g., as described in relation to FIG. 3).

The automated assistant 115 can utilize the inference reconciler engine 192 to process, using an inference reconciler (e.g., stored in the inference reconciler(s) database 192A), an inference retrieved from the inference(s) database 198A and additional data (e.g., as described with respect to FIGS. 2, 5 and 6) to reconcile the retrieved inference with the additional data, for example to generate a modified (i.e., updated) confidence indicator for the retrieved inference based on the additional data and/or to generate a new inference based on the retrieved inference and the additional data (and a confidence indicator for the new inference). The modified confidence indicator(s) and/or new inference(s) (and corresponding confidence indicator(s)) can be stored in the inference(s) database 198A.

The inference reconciler may comprise any suitable machine learning (ML) model(s) (e.g. stored in the ML model(s) database 115A) that is capable of processing a received inference and additional data to generate a modified confidence indicator for the inference as output and/or to generate one or more new inferences as output (and, in some instances, a corresponding confidence indicator for each new inference). In some instances, the inference generator may comprise an LLM, for example, the LLM may be LaMDA, BERT, BARD, Meena, PaLM, GPT-3, GPT-4, and/or any other LLM, such as any other LLM that is encoder-only based, decoder-only based, sequence-to-sequence based and that optionally includes an attention mechanism or other memory. However, the inference generator comprising an LLM is given by way of example only, and any other suitable machine learning (ML) model(s) may be used instead. The inference reconciler (e.g., the inference reconciler ML model(s)) may have been trained to process a received inference and additional data to generate a modified confidence indicator for the inference as output and/or to generate one or more new inferences as output (and, in some instances, a corresponding confidence indicator for each new inference, (e.g., as described in relation to FIG. 4).

Over time, the automated assistant 115 can process a plurality of NL based inputs using the inference generator to generate a plurality of inferences (and, in some instances, corresponding confidence indicators), and store the plurality of inferences (and, where generated, the confidence indicators) in the inference(s) database 198A. The automated assistant 115 can utilize one or more inferences generated using the inference generator (and, in some instances, their corresponding confidence indicators) that have been stored in the inference(s) database 198A to generate an NL based response using a large language model (LLM) (e.g., an LLM stored in the ML model(s) database 115A), for example as described in relation to FIG. 5 or 6.

Over time, the automated assistant 115 can also process, in some examples over multiple iterations, one or more of the stored inferences with additional data using the inference reconciler in order to generate modified confidence indicators for the one or more stored inferences and store the modified confidence indicators in the inference(s) database 198A. Additionally or alternatively, the automated assistant 115 can also process, in some examples over multiple iterations, one or more of the stored inferences with additional data using the inference reconciler in order to generate one or more new inferences and corresponding confidence indicators and store the new inferences and corresponding confidence indicators in the inference(s) database 198A. The confidence indicators of inferences stored in the inference(s) database 198A may therefore be dynamically updated over time as additional information provided by new NL based inputs, (which may support or contradict one or more stored inferences) is received by the automated assistant 115. The automated assistant 115 can utilize one or more new inferences and corresponding confidence indicators stored in the inference(s) database 198A to generate an NL based response using a large language model (LLM) (e.g., an LLM stored in the ML model(s) database 115A) (e.g., as described with respect to FIGS. 2, 5 and 6). The automated assistant 115 can also utilize one or more previously-stored inferences and their corresponding modified confidence indicators stored in the inference(s) database 198A to generate an NL based response using a large language model (LLM) (e.g., an LLM stored in the ML model(s) database 115A) (e.g., as described with respect to FIGS. 2, 5 and 6).

Figure 3:
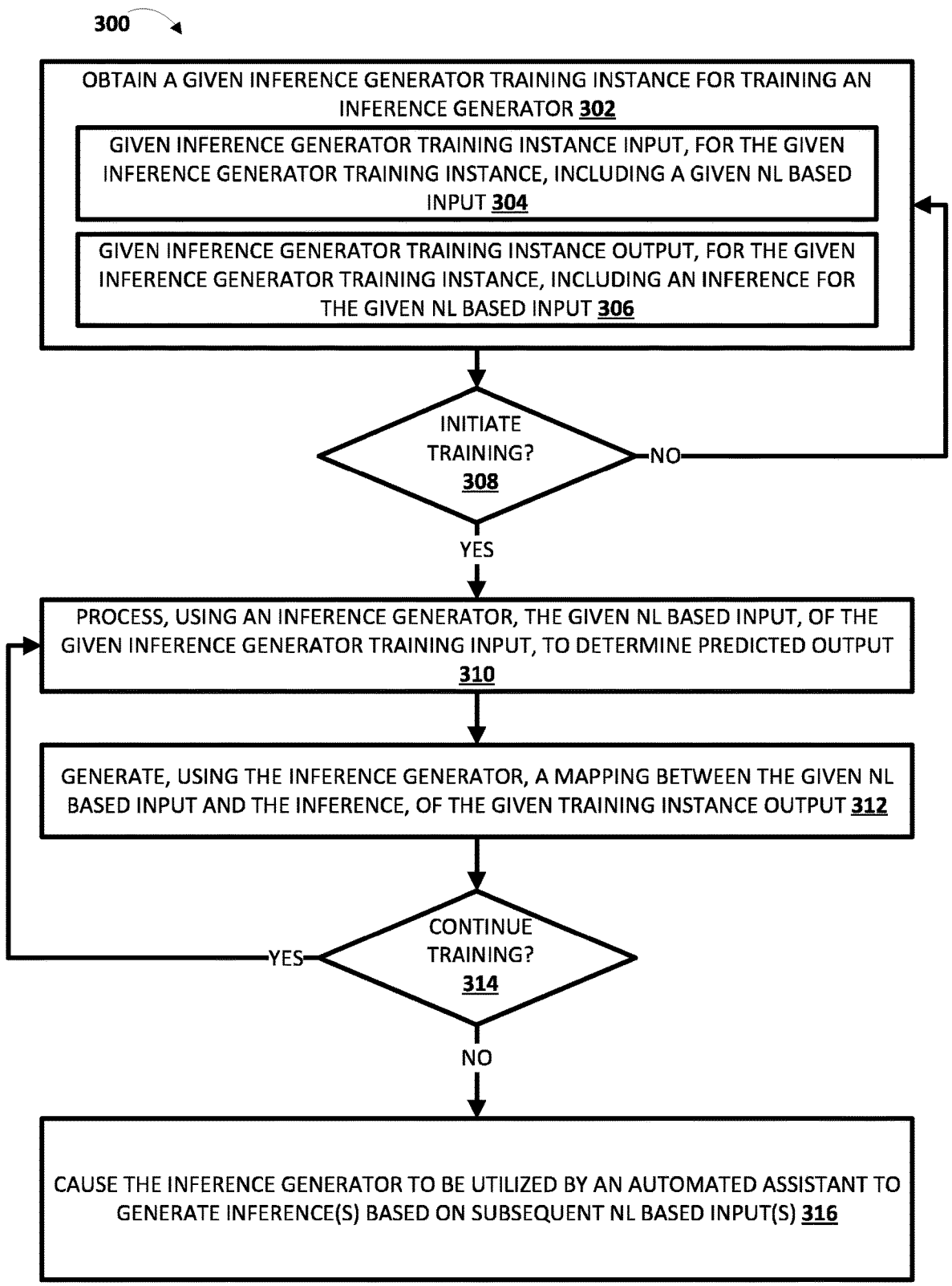
FIG. 3 depicts a flowchart illustrating an example method of training an inference generator to be subsequently utilized in generating inferences, in accordance with various implementations.

In at least some implementations, the inference generator can be trained prior to utilization by the automated assistant 115 (e.g., as described with respect to FIG. 3). Additionally or alternatively, in at least some of these implementations the inference reconciler can be trained prior to utilization by the automated assistant 115 (e.g., as described with respect to FIG. 4).

In some implementations, the automated assistant 115 can utilize a fine-tuned LLM to perform the operations of the inference generator and/or inference reconciler, and to generate NL based responses utilizing one or more inferences generated and/or reconciled by the fine-tuned LLM. That is, the automated assistant 115 can utilize a fine-tuned LLM to generate and store one or more inferences, reconcile the one or more inferences, and generate an NL based response based on the reconciled one or more inferences. In these implementations, the fine-tuned LLM can be fine-tuned prior to utilization by the automated assistant 115 (e.g., by training the LLM using the method 300 as described with respect to FIG. 3 and/or by training the LLM using the method 400 as described with respect to FIG. 4).

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., in a household environment, in an enterprise or work environment, in a hospitality environment, etc.).

Turning now to FIG. 2, an example process flow 200 of utilizing inference generation and reconciliation in the generation of an NL based response by an LLM is depicted. Notably, the process flow 200 of FIG. 2 is described as being implemented by the automated assistant 115 from FIG. 1. For the sake of example, assume that NL based input 201 directed to the automated assistant 115 provided by a user of the client device 110 is detected via the user input engine 111. In some implementations, the NL based input can include spoken utterance(s) directed to the automated assistant 115. In these implementations, the automated assistant 115 can cause the ASR engine 130A1 and/or 130A2 to process audio data that is generated by microphone(s) of the client device 110 and that captures the spoken utterance(s) to generate ASR output, such as recognized text that is predicted to correspond to the spoken utterance(s). In these implementations, the automated assistant 115 can cause the recognized text to be provided to the inference generator engine 190 as the NL based input 201. In additional or alternative implementations, the NL based input 201 can include typed input directed to the automated assistant 115 (e.g., via an automated assistant software application that is accessible at the client device 110). In these implementations, the automated assistant 115 can cause the typed input to be provided to the inference generator engine 190 as the NL based input 201. Notably, the NL based input 201 can be provided as part of dialog between the user of the client device 110 and the automated assistant 115.

The automated assistant 115 can cause the inference generator engine 190 to process, using an inference generator (e.g., that is stored in the inference generator(s) database 190A and that may have been previously trained (e.g., as described with respect to FIG. 3)), the NL based input 201 to generate one or more inferences 202 associated with the user and the NL based input 201. In some instances, the inference generator may also generate a corresponding confidence indicator for each inference, wherein the confidence indicator is indicative of a degree of confidence that the generated inference is true.

In some instances, the automated assistant 115 may cause the one or more inferences 202 generated using the inference generator to be generated based on one or more contextual signals 203, in addition to the NL based input 201. For example, the automated assistant 115 can cause the contextual signal engine 182 to obtain one or more contextual signals 203, and the automated assistant 115 can cause the contextual signal engine 182 to provide the one or more contextual signals 203 (or a context determined based on the one or more contextual signals 203 using the context engine 113) to the inference generator engine 190. In turn, the automated assistant 115 can cause the inference generator engine 190 to process, using the inference generator, the NL based input 201 with the one or more contextual signals 203 to generate the one or more inferences 202.

The one or more contextual signals 203 can include, for example, contextual signals associated with the user of the client device 110, such as user profile data that characterizes a user profile of the user of the client device 110, user attribute data that characterizes one or more attributes of the user of the client device 110, user preference data that characterizes one or more preferences of a user of the client device 110, user interaction data that characterizes recent user interactions with the client device, and/or other contextual signals associated with the user of the client device 110. Further, the one or more contextual signals 203 can include, for example, contextual signals associated with the client device 110 itself, such as location data that characterizes a current or recent location(s) of the client device 110, temporal data that characterizes a time of day or day of week associated with the client device 110, state of charge data that characterizes a current state of charge of the client device 110, and/or other contextual signals associated with the client device 110. Moreover, the one or more contextual signals 203 can include, for example, one or more contextual signals associated with assistant responses that are generated using a typical pipeline of components (e.g., based on NLU output and/or fulfillment output), such as NLU output and/or fulfillment output for weather information in instances where the NL based input 201 requests the weather information, NLU output and/or fulfillment output for traffic information in instances where the NL based input requests the traffic information, and/or other assistant responses generated based on NLU output and/or fulfillment output that is responsive to the NL based input 201.

For instance, the one or more contextual signals 203 can indicate that the user of the client device 110 is a "visitor looking for popular events in Louisville, Kentucky" based on a recently issued query, profile data, and an anticipated future location of the client device 110 (e.g., based on recently booked hotel accommodations). Also, for instance, the one or more contextual signals 203 can indicate a software application that is active in the foreground of the client device 110, a current or recent state of the active software application, and/or content currently or recently rendered by the active software application. Also, for instance, the one or more contextual signals 203 can indicate fulfillment output for weather information of "The weather in Louisville, Kentucky right now is 62 degrees and sunny" based on the user of the client device 110 requesting weather information in the NL based input 201, and the automated assistant 115 processing the NL based input 201 using the ASR engine 130A1 and/or 130A2 and/or the NLU engine 140A1 and/or 140A2 to generate the fulfillment output (and optionally interacting with a weather services software application or the like to obtain the weather information).

The inference generator engine 190 causes the one or more inferences 202 generated using the inference generator to be stored in an inference(s) database 198A. If a respective confidence indicator was also generated by the inference generator, the inference generator engine 190 may also cause that confidence indicator to be stored in the inference(s) database 198A in association with the respective inference(s) 202. In some instances, the automated assistant 115 may cause the NL based input 201 (or a portion thereof) to also be stored in the database 198A, for example in association with the inference(s) 202. Additionally or alternatively, in some instances the automated assistant 115 may cause an embedding of the NL based input 201 (or a part thereof) to be generated and to be stored in the database 198A, for example in association with the inference(s) 202. The embedding may have been generated using any suitable embedding model, for example GloVe or word2vec.

As additional NL based inputs directed to the automated assistant 115 are provided by the user over time, these additional NL based inputs may each be processed by the inference generator engine 190 in the same manner as described in relation to the NL based input 201, to generate one or more additional inferences (and, in some examples, corresponding confidence indicators). Furthermore, the one or more additional inferences (and corresponding confidence indicators, where also generated) will be stored in the inference(s) database 198A.

The automated assistant 115 can cause the inference reconciler engine 192 to process, using an inference reconciler (e.g., that is stored in the inference reconciler(s) database 192A and that is previously trained (e.g., as described with respect to FIG. 4)), at least one inference previously generated by the inference generator (and, in some instances, the confidence indicator for that inference) with additional data to modify a confidence indicator for the at least one previously generated inference 203 (e.g., as described with respect to FIG. 5) and/or to generate one or more new inferences 203 (and, in some instances, corresponding confidence indicator(s) for the one or more new inferences 203) (e.g., as described with respect to FIG. 6). The previously generated inference(s) (and in some examples the additional data) may be retrieved from the inference(s) database 198A by the inference reconciler engine 192.

Where the inference reconciler is an ML model (e.g. an LLM, stored in the inference reconciler(s) database 192A), processing the at least one inference previously generated by the inference generator (and, in some instances, the confidence indicator for that inference) with additional data to modify a confidence indicator for the at least one previously generated inference may comprise providing the at least one inference and the additional data (and optionally the confidence indicator for the inference) to the ML model (e.g. LLM) in an LLM prompt, and receiving the modified confidence indicator for the previously generated inference as an LLM output.

FIG. 2 shows the inference 202 that was generated based on the NL based input 201 as the at least one previously inference retrieved by the inference reconciler engine 192 to be processed using the inference reconciler, however it should be understood that the at least one inference could additionally or alternatively be any other inference previously generated by the inference generator and stored in the inference(s) database 198A, for example an inference that was generated based on a previous NL based input received prior to the NL based input 201 (either as part of the same dialog between the user of the client device 110 and the automated assistant 115 or as part of a previous or subsequent dialog between the user of the client device 110 and the automated assistant 115).

The additional data which is provided by the inference reconciler engine 192 to the inference reconciler to be processed with the inference(s) 202 can take various forms. In some examples, the additional data may comprise one or more additional inferences that have been retrieved by the inference reconciler engine 192 from the inference(s) database 198A, optionally with corresponding confidence indicators for the one or more additional inferences, wherein the one or more additional inferences have been previously generated by the inference generator (e.g., based on processing one or more previous NL based inputs in the same manner as the NL based input 201) and stored in the inference(s) database 198A. For example, the additional inference(s) may have been generated by the inference generator engine 190 causing another NL based input(s) (e.g., received prior to or after the NL based input 201, either as part of the same dialog between the user of the client device 110 and the automated assistant 115 or as part of a previous or subsequent dialog) to be processed using the inference generator and causing the resulting additional inference(s) to be stored in the inference(s) database 198A.

Additionally or alternatively, the additional data may comprise one or more NL based inputs (or portions thereof) that have been stored by the NL based response system 120 (e.g., in inference(s) database 198A or another database) and subsequently retrieved. For example, the one or more NL based inputs (or portions thereof) may have been provided by the user as part of the same or different (i.e., previous or subsequent) dialog between the user of the client device 110 and the automated assistant 115 to the dialog from which the inference(s) 202 was generated.

Additionally or alternatively, the additional data may comprise one or more contextual signals, for example one or more contextual signals obtained by the contextual signal engine 182, or a context determined based on one or more contextual signals. The one or more contextual signals may take any form described herein. Furthermore, the contextual signals may be the same or different to the contextual signals 203 described in relation to the inference generator engine 190.

In implementations where the inference reconciler engine 192 uses the inference reconciler to generate a new, additional inference 203 and optionally a corresponding confidence indicator (e.g., as described with respect to FIG. 6), the inference generator engine 190 causes the additional inference 203 (and corresponding confidence indicator, where generated) to be stored in the inference(s) database 198A. In implementations where the inference reconciler engine 192 has modified the confidence indicator of an inference 202 retrieved from the inference(s) database 198A (e.g., as described with respect to FIG. 5), the inference generator engine 190 causes the modified confidence indicator to be stored in the inference(s) database 198A in association with the retrieved inference 202. In some examples, this will involve the confidence indicator of the retrieved inference 202 being replaced by the modified confidence indicator in the inference(s) database 198A. In other examples, this will involve the modified confidence indicator being stored in association with the retrieved inference 202 and the previous confidence indicator for the retrieved inference 202, for example with a timestamp for the modified confidence indicator.

While it is generally disclosed that the inference reconciler engine 192 and inference reconciler can be used to modify the confidence indicator of an inference (e.g., as described with respect to FIG. 5) or to generate a new, additional inference (e.g., as described with respect to FIG. 6), it should be noted that in some implementations the inference reconciler engine 192 and inference reconciler can be used both to modify confidence indicators and generate new additional inferences. In these implementations, the inference reconciler engine 192 and inference reconciler may be capable of both modifying a confidence indicator and generating a new inference during a same instance of processing, or during separate instances of processing. Furthermore, it should be noted that in some implementations the inference reconciler engine 192 and inference reconciler may be capable of modifying more than one confidence indicator and/or generating more than one new, additional inference during a single instance of processing.

FIG. 2 shows the inference reconciliation engine 192 has caused the inference reconciler to process the inference(s) 202 and the additional data to generate a new, additional inference(s) 203. As a non-limiting example, the inference reconciler may have processed an inference 202 of "User likes tacos" with additional data (for example an inference of "User likes enchiladas") to generate a new, additional inference 203 of "User likes Mexican food". The inference reconciler engine 192 causes the new inference 203 to be stored in the inference(s) database 198A. In examples where the inference reconciler also generates a confidence indicator for the new inference 203, the inference reconciler engine 192 causes that confidence indicator to be stored in the inference(s) database 198A, in association with the new inference 203. In some examples, the inference reconciler can be used to output more than one new inference with each processing of the inference(s) 202 and the additional data. For instance, returning to the example of the inference reconciler processing the inference 202 of "User likes tacos" with the inference of "User likes enchiladas", the inference reconciler may generate another additional inference of "User likes Mexico" in addition to the new, additional inference 203 of "User likes Mexican food". Each new inference(s) 203 is stored in the inference(s) database 198A, in association with corresponding confidence indicators if generated.

In some implementations, the new, additional inference(s) 203 may be a modified version of the retrieved inference(s) 202, for example the inference 202 may be "User has a dog" and the additional inference 203 may be "User has a spaniel", such that "dog" has been replaced with "spaniel". In some implementations, the additional inference(s) 203 may be a seemingly very different inference to the retrieved inference(s) 202, for example the inference 202 may be "User lives in Las Vegas" and the additional inference 203 may be "User has a car", however the inference reconciler may have determined, based on the inference 202 of "User lives in Las Vegas" and additional data (such as an inference of "User dislikes public transport"), that the additional inference 203 of "User has a car" may reasonably be true.

Additionally or alternatively to generating a new inference(s) 203, the inference reconciler engine 192 may be arranged to process the inference(s) 202 and the additional data to generate a modified confidence indicator for the inference(s) 202. The modified confidence indicator is indicative of an updated degree of confidence that the inference(s) 202 is true, based on the additional data. As a non-limiting example, the inference reconciler may be used to process an inference 202 of "User likes football" and its associated confidence indicator (in this example, a confidence score) of "0.5" with additional data (for example an inference of "User likes David Beckham" and its associated confidence score of "0.8") to generate a modified confidence indicator of "0.7" for the inference of "User like football". In this example, a higher confidence score is indicative of a greater degree of confidence that an inference is true.

Therefore, based on the inference 202 of "User likes football" and the inference of "User likes David Beckham", and their associated confidence scores, the inference reconciler has modified the confidence indicator for the inference 202 of "User likes football" to indicate a greater degree of confidence that the inference 202 of "User likes football" is true. Continuing the example, if the inference reconciler is subsequently used to process the inference 202 of "User likes football" having the modified confidence indicator of "0.7" with additional data comprising an inference of "User dislikes sports" (with, for instance, an associated confidence indicator of "0.8"), the inference generator may now modify the previously-modified confidence indicator associated with the inference 202 of "User likes football" based on the inference of "User dislikes sports" (and, optionally, the associated confidence indicator of "0.8") to generate a new modified confidence indicator for the inference 202 of "User likes football". In this example, the inference of "User dislikes sports" has a confidence indicator of "0.8" that may indicate a relatively high degree of confidence that the inference of "User dislikes sports" is true. As such, the inference of "User dislikes sports" appears to contradict, to some extent, the inference 202 of "User likes football", and so the inference reconciler may modify the confidence indicator of the "User likes football" inference to indicate a decreased confidence that the "User dislikes football" inference is true. For example, the inference reconciler may modify the previously-modified confidence score of "0.7" to generate a modified confidence indicator for the "User dislikes football" inference of "0.3", which is lower than the previous modified confidence indicator of "0.7". It should therefore be apparent that, at least in some implementations, the confidence indicator associated with an inference may be dynamically modified over time based on processing the inference using the inference reconciler to indicate increased and/or decreased degrees of confidence that the inference is true.

In some examples, the inference reconciler engine 192 may be arranged such that it reconciles (i.e., processes using the inference reconciler) an inference in response to that inference being generated by the inference generator engine 190. Additionally or alternatively, the inference reconciler engine 192 may be arranged to reconcile one or more inferences stored in the in the inference(s) database 198A periodically. For example, the inference reconciler engine 192 may be arranged to reconcile one or more inferences in accordance with a schedule (e.g. once per hour, once per day, once per week, etc.). Additionally or alternatively, the inference reconciler engine 192 may be arranged to reconcile one or more inferences stored in the in the inference(s) database 198A in response to receiving a signal, for example in response to receiving a user input indicating that a reconciliation is to be performed (e.g., the user input could be provided by the user of the client device 110 via the user input engine 111 of the client device 110, or could be provided by a third party). Additionally or alternatively, the inference reconciler engine 192 may be arranged to reconcile one or more inferences stored in the in the inference(s) database 198A in response to a determination that a predetermined number of inferences have been stored in the inference(s) database 198A, and/or in response to a determination that a predetermined number of inferences have been stored in the inference(s) database 198A within a predetermined time period.

One or more of the inferences stored in the inference(s) database 198A can be utilized in generating an NL based response 207 using an LLM (e.g., an LLM stored in the ML model(s) database 115A). For example, responsive to an NL based input (e.g. the NL based input 201 or a subsequent NL based input) directed to the automated assistant 115 being provided by a user of the client device 110 in accordance with any suitable technique disclosed herein, the inference retrieval engine 194 may retrieve one or more inferences 204 (and in some instances their associated confidence indicator(s)) from the inference(s) database 198A and provide the one or more retrieved inferences 204 (and in some instances their associated confidence indicators) to the modification engine 195.

The one or more inferences 204 retrieved by the inference retrieval engine 194 (and optionally the associated confidence score(s)) may have been generated using any technique disclosed herein. For example, the inference(s) 204 may comprise one or more inferences that were generated by the inference generator engine 190 that have not yet been processed by the inference reconciler engine 192 (e.g. inference 202). Additionally or alternatively, the inference(s) 204 may comprise one or more inferences generated by the inference generator engine 190 that have been processed by the inference reconciler engine 192 (for example to generate a modified confidence score for the inference(s)). Additionally or alternatively, the inference(s) 204 may comprise one or more new, additional inferences generated by the inference reconciler engine 192 (e.g., inference 203), where the additional inference may or may not have been further processed by the inference reconciler engine 192 after being generated and stored.

In some implementations, the inference retrieval engine 194 may filter the retrieved inferences 204, for example based on the confidence indicator(s) associated with each retrieved inference 204. For example, the inference retrieval engine 194 may select, from a set of retrieved inferences 204, a subset of those retrieved inferences 204 for providing to the modification engine 195. The inference retrieval engine 194 may select the subset of retrieved inferences 204 based on one or more criteria. For example, one criterion may be that the confidence indicator of the retrieved inference 204 is of a predetermined type. Another example criterion is that the confidence indicator is within a predetermined range or meets a predetermined threshold value (e.g., where the confidence indicator is a score).

The NL based response system 120 may be arranged to determine, based at least on the confidence indicator associated with a retrieved inference 204, whether to process, using the LLM (e.g., stored in the ML model(s) database 115A), the inference 204 with a received NL based input (e.g. NL based input 201 or a different NL based input) to generate an NL based response 207. For example, the NL based response system 120 may determine to process the retrieved inference 204 with the received NL based input if the confidence indicator associated with the retrieved inference 204 is of a predetermined type, is within a predetermined range, or meets a predetermined threshold value (e.g., if the confidence indicator is a score). As such, the NL based response system 120 may determine to process an inference 204 with the received NL based input only if the confidence indicator associated with the inference 204 is indicative of the inference likely being true (e.g. where the confidence indicator is a score and is within a predetermined range and/or above a predetermined threshold value indicating a high degree of confidence that the inference 204 is true).

Responsive to a determination that the retrieved inference 204 and the NL based input 201 should be processed using the LLM, the modification engine 195 is arranged to modify the NL based input 201 using the retrieved inference(s) 204 to generate a modified NL based input 205. For example, in modifying the NL based input 201, the modification engine 195 can prepend and/or postpend the retrieved inference(s) 204 to the NL based input 201 to generate the modified NL based input 205. As an example, for an NL based input 201 of "Where should I go on holiday?" and a retrieved inference 204 of "User likes snow", the modified NL based input 205 may be an LLM prompt of "Answer the following query provided by a User. Take into account the following information when providing your answer: User likes snow. Query=Where should I go on holiday?".

In some instances, for example based on the (modified) confidence indicator of the retrieved inference 204, the modification engine 195 may generate a modified NL based input 205 that, when processed using the LLM, will cause the LLM to generate an NL based response 207 that prompts the user to provide a follow-up NL based input to clarify whether the retrieved inference 204 is true. For example, responsive to the NL based response system 120 determining, that a confidence score associated with the retrieved inference 204 falls within a predetermined range of values, is equal to a predetermined value, or is above or below a predetermined threshold value, the modification engine 195 may generate a modified NL based input 205 that, when processed using the LLM, will cause the LLM to generate an NL based response 207 that prompts the user to provide a follow-up NL based input to clarify whether the retrieved inference 204 is true. As a non-limiting example, based on a confidence score of "0.5" associated with a retrieved inference 204 of "User likes snow" being determined to fall within a predetermined range of "0.3-0.7" and therefore indicating a 'medium' degree of confidence that the retrieved inference 240 is true, an NL based input 201 of "Where should I go on holiday?" may be modified by the modification engine 195 to generate a modified NL based input 205 (e.g. NL LLM prompt) of "Answer the following query provided by a User. As part of your answer, seek clarification from the User on whether the following information is true: User likes snow. Query=Where should I go on holiday?".

The automated assistant 115 can cause the LLM engine 150A1 and/or 150A2 to process, using the LLM (e.g., stored in the ML model(s) database 115A), the modified NL based input 205 to generate LLM output 206, and can cause the NL based response engine 196 to generate, based on the LLM output 206, an NL based response 207. The LLM output 206 can include, for example, a probability distribution over a sequence of words or phrases that are predicted to be responsive to the modified NL based input 205 the NL based response engine 196 can select one or more words or phrases for inclusion in the NL based response 207.

The automated assistant 115 can cause the NL based response 207 generated using the LLM to be rendered at the client device 110 (e.g., using the rendering engine 112). For example, causing the NL based response 207 to be rendered at the client device 110 may comprise causing the NL based response 207 to be visually rendered at the client device via a display of the client device. Additionally or alternatively, causing the NL based response 207 to be rendered at the client device 110 may comprise causing the NL based response 207 to be audibly rendered at the client device via one or more speakers of the client device 110. Causing the NL based response to be rendered at the client device 110 may comprise transmitting data to the client device 110 that is operable for causing the client device 110 to render the NL based response 207.

The LLM described herein for generating an NL based response can be any LLM that is capable of being utilized in processing NL based inputs and generating LLM outputs. For example, the LLM may be LaMDA, BERT, Meena, PaLM, and/or any other LLM, such as any other LLM that is encoder-only based, decoder-only based, sequence-to-sequence based and that optionally includes an attention mechanism or other memory. Notably, the LLM can include billions of weights and/or parameters that are learned through training the LLM on enormous amounts of diverse data. This enables the LLM (e.g., prior to fine-tuning) to generate the LLM output as the probability distribution over a sequence of tokens and based on processing NL based input, contextual data, and/or other data.

Although FIG. 2 is described with respect to the automated assistant 115 using additional machinery (e.g., the inference generator engine 190 using the inference generator(s) and the inference reconciler engine 192 using the inference reconciler(s)), it should be understood that is for the sake of example and is not meant to be limiting. For example, in other implementations, the LLM (e.g., stored in the ML model(s) database 115A and utilized to generate the LLM output 206) can be utilized to perform the functions of the inference generator(s) and/or inference reconciler(s), for example by fine-tuning the LLM. In these implementations, the inference generator engine 190 and/or the inference reconciler engine 192 can be omitted, and the fine-tuned LLM itself can be utilized to generate and/or reconcile inferences. In other implementations, the functions of the inference generator(s) and the inference reconciler(s) may be implemented by the same ML model(s) (e.g., ML model(s) stored in the ML model(s) database 115A), for example by training the ML model(s) as described with respect to FIG. 3 and/or FIG. 4.

Turning now to FIG. 3, a flowchart illustrating an example method 300 of training an inference generator (e.g., as stored in the inference generator database 190A of FIGS. 1 and 2) to be subsequently utilized in generating one or more inferences based on an NL based input is depicted. For convenience, the operations of the method 300 are described with reference to a system that performs the operations. This system of the method 300 includes one or more processors, memory, and/or other component(s) of computing device(s) (e.g., client device 110 of FIG. 1, NL based response system 120 of FIG. 1, client device 910 of FIGS. 7A, 7B and 7C, computing device 1010 of FIG. 8, one or more servers, and/or other computing devices). Moreover, while operations of the method 300 are shown in a particular order, this is not meant to be limiting. One or more operations may be reordered, omitted, and/or added.

At block 302, the system obtains a given inference generator training instance for training an inference generator (e.g., using the inference generator training instances engine 171). For example, and indicated at block 304, the given inference generator training instance can include given training instance input that includes a given NL based input. Further, and as indicated at block 306, the given inference generator training instance can include given training instance output that includes at least one inference for the given NL based input (and, in some instances, a corresponding confidence indicator for the inference(s)). In some implementations, the given inference generator training instance for training the inference generator can be obtained from one or more databases (e.g., from training instance(s) database 171A). In some versions of these implementations, the training instance(s) database 171A can include inference generator training instances that are pre-curated and generated based on prior dialogs between users or users and respective automated assistants. In additional or alternative implementations, the given inference generator training instance can be generated by the system based on prior dialogs between users or users and respective automated assistants. In additional or alternative implementations, the given inference generator training instance can be obtained from a third-party, such as an entity that is different from an entity that manages or hosts the system.

At block 308, the system determines whether to initiate training of the inference generator. The system can determine whether to initiate training of the inference generator in response to determining whether one or more conditions are satisfied. The one or more conditions can include, for example, whether a threshold quantity of inference generator training instances have been obtained for training the inference generator, a time of day, a day of week, whether a threshold quantity of computational resources are available for training the inference generator, and/or other conditions. If, at an iteration of block 308, the system determines not to initiate training of the inference generator, the system returns to block 300 to obtain a given additional inference generator training instance. If, at an iteration of block 308, the system determines to initiate training of the inference generator, the system proceeds to block 310.

At block 310, the system processes, using the inference generator, the given NL based input, of the given inference generator training instance input, to determine predicted output. The predicted output can include, for example, one or more predicted inferences (and, in some instances, corresponding confidence score(s)), corresponding values (e.g., probabilities, log-likelihoods, and/or other values) associated with the one or more predicted inferences (and, in some instances, the corresponding confidence score(s)), and/or other predicted output determined based on processing the given NL based input. For instance, the system can process the given NL based input to determine the one or more predicted inferences (and optionally the corresponding values associated therewith) as the predicted output. As an example, assume that the given NL based input comprises "Hey Assistant, where are the best places to go cycling in London?". In this instance, the one or more predicted inferences could include a first inference of "User likes cycling" that is associated with a first corresponding value, a second inference of "User likes fishing" associated with a second corresponding value, and a third inference of "User lives in New York" associated with a third corresponding value. It should be understood that this example is non-limiting, and that in other examples a different number of inferences can be predicted.

At block 312, the system generates, using the inference generator, a mapping between the given NL based input and the inference, of the given inference generator training instance output. In generating the mapping between the given NL based input and the inference, the system can compare the one or more predicted inferences of the predicted output generated based on processing the given training instance input and the inference of the given training instance output. For instance, again assume that the given NL based input comprises "Hey Assistant, where are the best places to go cycling in London?", and assume that the one or more predicted inferences can include the first inference of "User likes cycling" with the first corresponding value, the second inference of "User likes fishing" with the second corresponding value, and the third inference of "User lives in New York" with the third corresponding value. Further assume that the inference of the given training instance output corresponds to the "User likes cycling" inference. In this instance, the "User likes cycling" inference can be utilized as ground truth to indicate that the NL based input should be mapped to the "User likes cycling" inference and can be associated with a corresponding ground truth value. Accordingly, in comparing the one or more predicted inferences of the predicted output generated based on processing the given training instance input and the inference of the given training instance output, the system can compare each of the first inference of "User likes cycling" and the first corresponding value, the second inference of "User likes fishing" and the second corresponding value, and the third inference of "User lives in New York" and the third corresponding value to the ground truth "User likes cycling" inference and the corresponding ground truth value. In this manner, the system can cause the inference generator to learn a mapping between NL based input and inferences.

At block 314, the system determines whether to continue training the inference generator. The system can determine whether to continue training of the inference generator in response to determining whether one or more conditions are satisfied. The one or more conditions can include, for example, whether a threshold quantity of inference generator training instances have been utilized for training the inference generator, a time of day, a day of week, whether a threshold quantity of computational resources are still available for training the inference generator, whether a threshold performance metric for the inference generator has been achieved, and/or other conditions. If, at an iteration of block 314, the system determines to continue training the inference generator, the system returns to block 310 to continue training the inference generator using a given additional inference generator training instance. If, at an iteration of block 314, the system determines not to continue training the inference generator, the system proceeds to block 316.

At block 316, the system causes the inference generator to be utilized by an automated assistant to generate one or more inference(s) based on subsequent NL based inputs (e.g., as described with respect to FIG. 2, 5 or 6).

Although the method 300 of FIG. 3 is described herein with respect to the system using a particular technique for learning the mapping between NL based inputs and inferences, it should be understood that is one example and should not be limiting. For example, in additional or alternative implementations, the system can receive the mapping from a developer associated with the system such that the mapping is heuristically defined by the developer. In these implementations, the mapping that is heuristically defined can correspond to rules for how the automated assistant should cause one or more inferences (and, in some implementations, corresponding confidence indicator(s)) to be generated based on one or more received NL based inputs.

Figure 4:
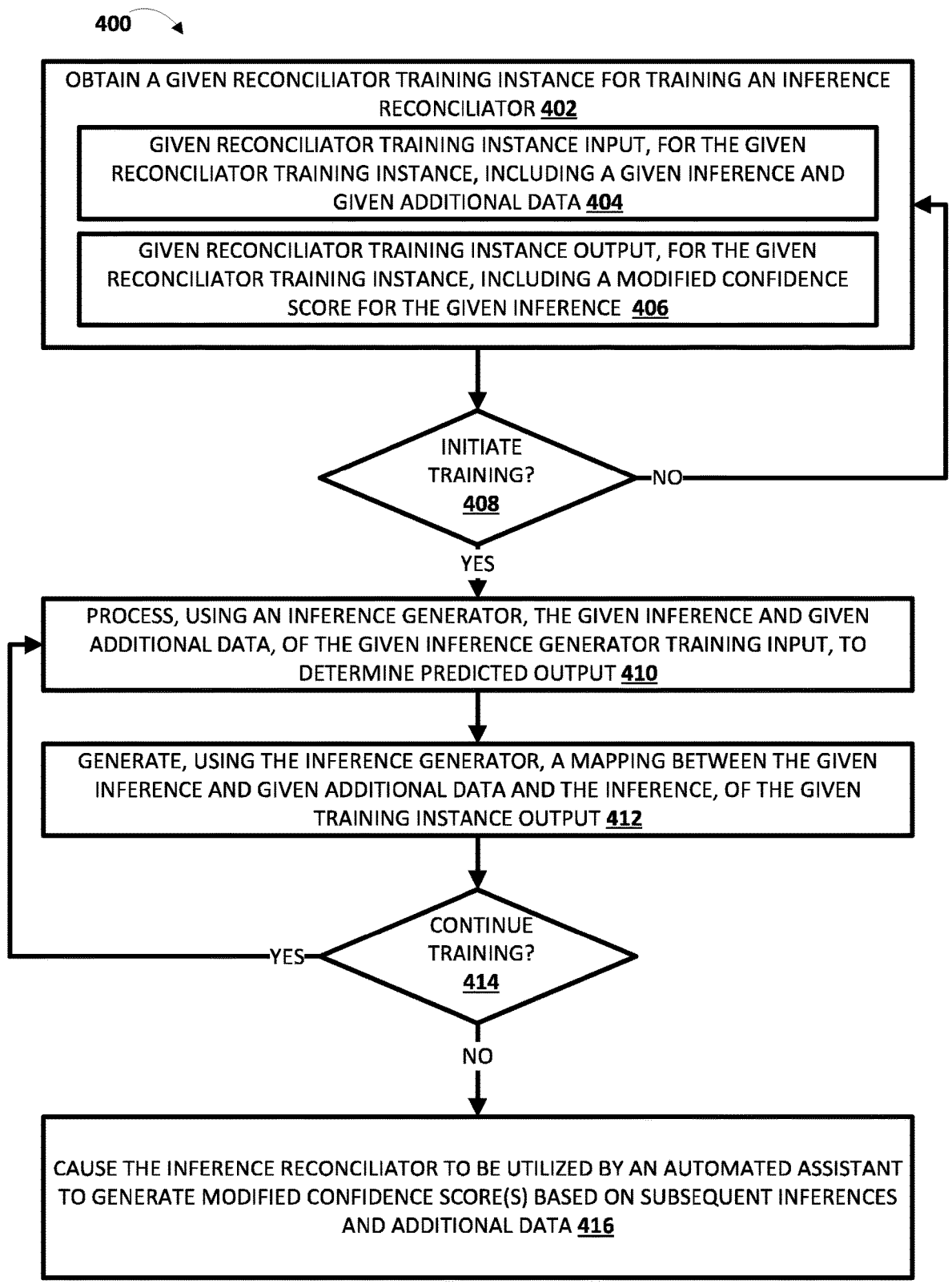
FIG. 4 depicts a flowchart illustrating an example method of training an inference reconciler to be subsequently utilized in generating new inferences and/or modifying confidence indicators associated with inferences, in accordance with various implementations.

Turning now to FIG. 4, a flowchart illustrating an example method 400 of training an inference reconciler (e.g., as stored in the inference reconciler(s) database 192A of FIGS. 1 and 2) to be subsequently utilized in generating a modified confidence indicator based on an inference and additional data is depicted. For convenience, the operations of the method 400 are described with reference to a system that performs the operations. This system of the method 400 includes one or more processors, memory, and/or other component(s) of computing device(s) (e.g., client device 110 of FIG. 1, NL based response system 120 of FIG. 1, client device 910 of FIGS. 7A, 7B and 7C, computing device 1010 of FIG. 8, one or more servers, and/or other computing devices). Moreover, while operations of the method 400 are shown in a particular order, this is not meant to be limiting. One or more operations may be reordered, omitted, and/or added.

At block 402, the system obtains a given reconciler training instance for training an inference reconciler (e.g., using the reconciler training instances engine 181). For example, and indicated at block 404, the given reconciler training instance can include given training instance input that includes a given inference and given additional data (and, in some instances, corresponding confidence indicator(s) for the given inference and/or given additional data), and as indicated at block 406, the given reconciler instance can include given reconciler training instance output that includes a modified confidence indicator for the given inference. In some implementations, the given reconciler training instance for training the inference reconciler can be obtained from one or more databases (e.g., from training instance(s) database 171A). In some versions of these implementations, the training instance(s) database 171A can include reconciler training instances that are pre-curated and generated based on prior dialogs between users or users and respective automated assistants. In additional or alternative implementations, the given reconciler training instance can be generated by the system based on prior dialogs between users or users and respective automated assistants. In additional or alternative implementations, the given reconciler training instance can be obtained from a third-party, such as an entity that is different from an entity that manages or hosts the system.

At block 408, the system determines whether to initiate training of the inference reconciler. The system can determine whether to initiate training of the inference reconciler in response to determining whether one or more conditions are satisfied. The one or more conditions can include, for example, whether a threshold quantity of reconciler training instances have been obtained for training the inference reconciler, a time of day, a day of week, whether a threshold quantity of computational resources are available for training the inference reconciler, and/or other conditions. If, at an iteration of block 408, the system determines not to initiate training of the inference reconciler, the system returns to block 400 to obtain a given additional reconciler training instance. If, at an iteration of block 408, the system determines to initiate training of the inference reconciler, the system proceeds to block 410.

At block 410, the system processes, using the inference reconciler, the given inference and given additional data (and, in some instances, corresponding confidence indicator(s) for the given inference and/or given additional data), of the given reconciler training instance input, to determine predicted output. The predicted output can include, for example, one or more predicted modified confidence indicators for the given inference, corresponding values (e.g., probabilities, log-likelihoods, and/or other values) associated with the one or more predicted modified confidence indicators for the given inference, and/or other predicted output determined based on processing the given inference and given additional data (and, in some instances, corresponding confidence indicator(s) for the given inference and/or given additional data). For instance, the system can process the given inference and given additional data (and, in some instances, corresponding confidence indicator(s) for the given inference and/or given additional data) to determine the one or more predicted modified confidence indicators for the given inference as the predicted output.

As an example, assume that the given reconciler training instance input comprises a given inference of "User likes horses", a given confidence indicator of "0.5" corresponding to the given inference of "User likes horses", given additional data comprising an additional inference of "User owns a horse", and a given confidence indicator of "0.9" corresponding to the given inference of "User owns a horse". In this instance, the one or more predicted modified confidence scores for the given inference of "User likes horses" could include a first modified confidence score of "0.9" that is associated with a first corresponding value, a second modified confidence score of "0.6" associated with a second corresponding value, and a third modified confidence score of "0.2" associated with a third corresponding value. It should be understood that this example is non-limiting, and that in other examples a different number of inferences can be predicted.

At block 412, the system generates, using the inference reconciler, a mapping between the given inference and additional data (and, in some instances, corresponding confidence indicator(s) for the given inference and/or given additional data), and the modified confidence indicator, of the given reconciler training instance output. In generating the mapping between the given inference and additional data, and the modified confidence indicator, the system can compare the one or more predicted modified confidence indicators of the predicted output generated based on processing the given reconciler training instance input and the modified confidence indicator of the given reconciler training instance output.

For instance, again assume that the given reconciler training instance input comprises a given inference of "User likes horses", a given confidence indicator of "0.5" corresponding to the given inference of "User likes horses", given additional data comprising an additional inference of "User owns a horse", and a given confidence indicator of "0.9" corresponding to the given inference of "User owns a horse", and again assume that the one or more predicted modified confidence scores for the given inference of "User likes horses" includes a first modified confidence score of "0.9" that is associated with a first corresponding value, a second modified confidence score of "0.6" associated with a second corresponding value, and a third modified confidence score of "0.2" associated with a third corresponding value. Further assume that the modified confidence indicator of the given reconciler training instance output corresponds to the "0.9" modified confidence score. In this instance, the "0.9" modified confidence score can be utilized as ground truth to indicate that the given reconciler training instance input should be mapped to the "0.9" modified confidence score and can be associated with a corresponding ground truth value. Accordingly, in comparing the one or more predicted modified confidence indicators of the predicted output generated based on processing the given reconciler training instance input and the modified confidence indicator of the given reconciler training instance output, the system can compare each of the first modified confidence indicator of "0.9" and the first corresponding value, the second modified confidence indicator of "0.6" and the second corresponding value, and the third modified confidence indicator of "0.2" and the third corresponding value to the ground truth "0.9" modified confidence indicator and the corresponding ground truth value. In this manner, the system can cause the inference reconciler to learn a mapping between inferences and additional data, and modified confidence indicators.

At block 414, the system determines whether to continue training the inference reconciler. The system can determine whether to continue training of the inference reconciler in response to determining whether one or more conditions are satisfied. The one or more conditions can include, for example, whether a threshold quantity of inference reconciler training instances have been utilized for training the inference reconciler, a time of day, a day of week, whether a threshold quantity of computational resources are still available for training the inference reconciler, whether a threshold performance metric for the inference reconciler has been achieved, and/or other conditions. If, at an iteration of block 414, the system determines to continue training the inference reconciler, the system returns to block 410 to continue training the inference reconciler using a given additional reconciler training instance. If, at an iteration of block 414, the system determines not to continue training the inference reconciler, the system proceeds to block 416.

At block 416, the system causes the inference reconciler to be utilized by an automated assistant to generate one or more modified confidence scores for a subsequent inference based on that inference and additional data (e.g., as described with respect to FIG. 2, 5 or 6).

Although the method 400 of FIG. 4 is described herein with respect to the system using a particular technique for learning the mapping between inferences and additional data and modified confidence indicators, it should be understood that is one example and should not be limiting. For example, in additional or alternative implementations, the system can receive the mapping from a developer associated with the system such that the mapping is heuristically defined by the developer. In these implementations, the mapping that is heuristically defined can correspond to rules for how the automated assistant should cause one or more modified confidence indicators to be generated based on one or more received inferences and additional data.

Although the method 400 of FIG. 4 is described herein with respect to training an inference reconciler to generate a modified confidence score, in additional or alternative implementations the method 400 may be used to train the inference reconciler to generate a new, additional inference based on processing a previous inference and additional data. In these implementations, the method 400 may differ from previously in that new inferences (and, in some examples, corresponding confidence indicators) may be provided/generated instead of modified confidence indicators.

Turning now to FIG. 5, a flowchart illustrating an example method 500 of utilizing an inference generator (e.g., an inference generator as described with respect to FIG. 1, 2 or 3) and an inference reconciler (e.g., an inference reconciler as described with respect to FIG. 1, 2 or 4) is depicted. For convenience, the operations of the method 500 are described with reference to a system that performs the operations. This system of the method 500 includes one or more processors, memory, and/or other component(s) of computing device(s) (e.g., client device 110 of FIG. 1, NL based response system 120 of FIG. 1, client device 910 of FIGS. 7A, 7B and 7C, computing device 1010 of FIG. 8, one or more servers, and/or other computing devices). Moreover, while operations of the method 500 are shown in a particular order, this is not meant to be limiting. One or more operations may be reordered, omitted, and/or added.

At block 552, the system receives an NL based input (e.g., as described with respect to the user input engine 111 of FIG. 1 or 2) as part of a dialog between a user of a client device and an automated assistant that is accessible at the client device.

At block 554, the system processes, using an inference generator (e.g., an inference generator stored in inference generator(s) database 190A and as described with respect to FIGS. 1, 2 and 3, and wherein the inference generator may be a first machine learning (ML) model), the NL based input to generate an inference associated with the user and, optionally, a confidence indicator for the inference (e.g., as described with respect to the inference generator engine 190 of FIGS. 1 and 2). Put another way, the system can utilize a learned mapping (e.g., learned according to the method 300 of FIG. 3 as described above) from NL based inputs to inferences to determine the given inference based on the NL based input. The confidence indicator is indicative of a degree of confidence that the inference is true and could, for example be a confidence score.

In some implementations, the system also obtains one or more contextual signals for the given dialog between the user of the client device and the automated assistant and processes, using the inference generator, the one or more context signals with the NL based input to generate the inference and the confidence indicator for the inference (e.g., as described with respect to the contextual signal engine 182 of FIGS. 1 and 2).

At block 556, the system stores the inference and the associated confidence indicator in a database (e.g., the inference(s) database 198A as described with respect to FIG. 1 and FIG. 2). In some examples, the NL based input (or a portion thereof) and/or one or more embeddings of the NL based input (or a portion thereof) may also be stored by the system in the database (e.g., the inference(s) database 198A as described with respect to FIGS. 1 and 2).

In some instances, and prior to block 558, blocks 552 to 556 may be repeated for one or more additional NL based inputs received as part of the dialog session or a different dialog session such that further inferences generated based on those one or more additional NL based inputs are stored in the database, along with their corresponding confidence indicators. However, merely for simplicity, block 556 is shown in FIG. 5 to be immediately followed by block 558.

At block 558, the system processes, using an inference reconciler (e.g., an inference reconciler stored in inference reconciler(s) database 192A and as described in relation to FIGS. 1, 2 and 4, and which may be a second ML model), the inference and additional data to generate a modified confidence indicator for the inference (e.g., as described previously in relation to the inference reconciler engine 192 of FIGS. 1 and 2). Put another way, the system can utilize a learned mapping (e.g., learned according to the method 400 of FIG. 4 as described above) from inferences and additional data to modified confidence indicators to determine the given modified confidence indicator based on the inference and additional data. The modified confidence indicator is indicative of an updated degree of confidence that the inference is true. The system may have retrieved the inference from the database prior to processing the inference using the inference reconciler.

The additional data may comprise one or more of the types of additional data as described previously in relation to inference FIG. 2. For example, the additional data may comprise one or more additional inferences (and, optionally, corresponding confidence indicators) that have been generated and stored in a similar manner to the inference. For example, the system may have received a further NL based input as part of a dialog between the user of the client device and the automated assistant (e.g., the same dialog used to obtain the first NL based input, a prior dialog, or a subsequent dialog). The system may have processed, using the inference generator, the further NL based input to generate a further inference associated with the user and a confidence indicator for the further inference, the confidence indicator for the further inference indicative of a degree of confidence that the further inference is true. The system may have subsequently stored the further inference and the confidence indicator for the further inference in the database. The additional data used in block 558 may comprise the further inference (and optionally the confidence indicator associated with the further indicator), having been retrieved from the database by the inference reconciler engine 192.

Additionally or alternatively to the one or more additional inferences, the additional data may comprise at least one of: one or more contextual signals as described previously, one or more NL based inputs (or portions thereof), or one or more embeddings of NL based inputs (or portions thereof), as described previously.

At block 560, the system stores the modified confidence indicator in the database in association with the inference (e.g., as previously described in relation to FIG. 2).

For simplicity, block 560 is shown in FIG. 5 to be immediately followed by block 562. However, it should be noted that in some instances, following block 560, the method 500 may return to block 558 to repeat blocks 558 to 560 (e.g., to reconcile the first inference with different additional data and/or to reconcile a different stored inference). Alternatively or additionally, following block 560, the method 500 may return to block 552 to repeat blocks 552 to 556 for one or more new NL based inputs, such that further inferences generated based on those one or more new NL based inputs are stored in the database, along with their corresponding confidence indicators.

At block 562, the system determines whether an additional NL based input has been received as part of a dialog (which may be the same dialog as block 552 or a subsequent dialog) between the user and the automated assistant. If, at an iteration of block 562, the system determines no additional NL based input has been received, then the system continues monitoring for the receipt of an additional NL based input at block 562 or, in some instances returns to a previous block such as block 552 or block 558. If, at an iteration of block 562, the system determines an additional NL based input has been received, the system proceeds to block 564.

At block 564, the system determines, based at least on the modified confidence indicator for the inference stored in the database, whether to process, using an LLM, the inference with the additional NL based input to generate an NL based response (e.g., as described with respect to the modification engine 195 of FIGS. 1 and 2). For example, the determination may be based on comparing the modified confidence indicator to a predetermined range or threshold value.

If the system determines at block 564 to process the inference with the additional NL based input, then the method 500 proceeds from block 564 to block 566. However, if the system determines at block 564 not to process the inference with the additional NL based input, then the method 500 proceeds from block 564 to block 572.

At block 566, the system modifies the additional NL based input based on the inference to generate a modified NL based input (e.g., as previously described in relation to the modification engine 195 of FIG. 2). For example, modifying the additional NL based input based on the inference to generate a modified NL based input may comprise prepending and/or postpending the inference to the additional NL based input.

At block 568, the system processes, using the LLM (e.g. an LLM stored in the ML model(s) database 115A as described with respect to FIGS. 1 and 2), the modified NL based input to generate an NL based response (e.g., as described with respect to the LLM engine 150A1 and/or 150A2 of FIGS. 1 and 2). In some implementations, and as described in relation to FIG. 2, the system also processes, using the LLM, and along with the modified NL based input, one or more contextual signals to generate the NL based response.

Following block 568, at block 570 the system causes the NL based response to be rendered at the client device (e.g., as described with respect to the rendering engine 112 of FIGS. 1 and 2) and/or another client device communicatively coupled to the system. In some implementations, the NL based response can be rendered for audible presentation to the user via speaker(s) of the client device. In these implementations, the system can process textual data corresponding to the NL based response (e.g., using the TTS engine 160A1 and/or 160A2) to generate synthesized speech audio data including synthesized speech that corresponds to the NL based response, and cause the synthesized speech audio data to be audibly rendered for presentation to the user of the client device via the speaker(s) of the client device. In additional or alternative implementations, the NL based response can be rendered for visual presentation to the user via a display of the client device. In some versions of these implementations, the system can cause the NL based response to be provided for visual presentation to the user in a streaming manner (e.g., as the NL based response is generated).

After block 570, the system may then return to block 552 to perform an additional iteration of the method 500 of FIG. 5 using a new NL based input (or may return to block 558 or block 562, for example).

If, however, the system determines at block 564 not to process the inference with the additional NL based input, then the method 500 proceeds from block 564 to block 572, at which the system processes, using the LLM, the additional NL based input without the inference to generate the NL based response. Put another way, the system does not modify the additional NL based input based on the inference, but instead processes the additional NL based input using the LLM without modification based on the inference. Block 572 may then be followed by block 570.

Turning now to FIG. 6, a flowchart illustrating another example method 600 of utilizing an inference generator (e.g., an inference generator as described with respect to FIG. 1, 2 or 3) and an inference reconciler (e.g., an inference reconciler as described with respect to FIG. 1, 2 or 4) is depicted. For convenience, the operations of the method 600 are described with reference to a system that performs the operations. This system of the method 600 includes one or more processors, memory, and/or other component(s) of computing device(s) (e.g., client device 110 of FIG. 1, NL based response system 120 of FIG. 1, client device 910 of FIGS. 7A, 7B and 7C, computing device 1010 of FIG. 8, one or more servers, and/or other computing devices). Moreover, while operations of the method 600 are shown in a particular order, this is not meant to be limiting. One or more operations may be reordered, omitted, and/or added.

At block 652, the system receives an NL based input (e.g., as described with respect to the user input engine 111 of FIG. 1 or 2) as part of a dialog between a user of a client device and an automated assistant that is accessible at the client device.

At block 654, the system processes, using an inference generator (e.g., an inference generator stored in inference generator(s) database 190A and as described with respect to FIGS. 1, 2 and 3, and wherein the inference generator may be a first machine learning (ML) model), the NL based input to generate an inference associated with the user and (optionally) a confidence indicator for the inference (e.g., as described with respect to the inference generator engine 190 of FIGS. 1 and 2). Put another way, the system can utilize a learned mapping (e.g., learned according to the method 300 of FIG. 3 as described above) from NL based inputs to inferences to determine the given inference based on the NL based input. The confidence indicator is indicative of a degree of confidence that the inference is true and could, for example, be a confidence score.

In some implementations, the system also obtains one or more contextual signals for the given dialog between the user of the client device and the automated assistant and processes, using the inference generator, the one or more context signals with the NL based input to generate the inference and the confidence indicator for the inference (e.g., as described with respect to the contextual signal engine 182 of FIGS. 1 and 2).

At block 656, the system stores the inference and the associated confidence indicator in a database (e.g., the inference(s) database 198A as described with respect to FIG. 1 and FIG. 2). In some examples, the NL based input (or a portion thereof) and/or one or more embeddings of the NL based input (or a portion thereof) may also be stored by the system in the database (e.g., the inference(s) database 198A as described with respect to FIGS. 1 and 2).

In some instances, and prior to block 658, blocks 652 to 656 may be repeated for one or more additional NL based inputs received as part of the dialog session or a different dialog session such that further inferences generated based on those one or more additional NL based inputs are stored in the database, along with their corresponding confidence indicators. However, merely for simplicity, block 656 is shown in FIG. 6 to be immediately followed by block 658.

At block 658, the system processes, using an inference reconciler (e.g., an inference reconciler stored in inference reconciler(s) database 192A and as described in relation to FIGS. 1, 2 and 4, and which may be a second ML model), the inference and additional data to generate a new, additional inference (e.g., as described previously in relation to the inference reconciler engine 192 of FIGS. 1 and 2). Put another way, the system can utilize a learned mapping (e.g., learned according to the method 400 of FIG. 4 as described above) from inferences and additional data to additional inferences to determine the given additional inference based on the inference and additional data. The inference reconciler may also generate an associated confidence indicator for the additional inference, wherein the confidence indicator is indicative of a degree of confidence that the inference is true, based at least on the inference and the additional data. The system may have retrieved the inference from the database prior to processing the inference using the inference reconciler.

The additional data may comprise one or more of the types of additional data as described previously in relation to inference FIG. 2. For example, the additional data may comprise one or more additional inferences (and, optionally, corresponding confidence indicators) that have been generated and stored in a similar manner as described with respect to blocks 652, 654 and 656. For example, the system may have received a further NL based input as part of a dialog between the user of the client device and the automated assistant (e.g., the same dialog used to obtain the first NL based input, a prior dialog, or a subsequent dialog). The system may have processed, using the inference generator, the further NL based input to generate a further inference associated with the user and a confidence indicator for the further inference, the confidence indicator for the further inference indicative of a degree of confidence that the further inference is true. The system may have subsequently stored the further inference and the confidence indicator for the further inference in the database. The additional data used in block 658 may comprise the further inference (and optionally the confidence indicator associated with the further inference), having been retrieved from the database by the inference reconciler engine 192.

Additionally or alternatively to the one or more additional inferences, the additional data may comprise at least one of: one or more contextual signals as described previously, one or more NL based inputs (or portions thereof), or one or more embeddings of NL based inputs (or portions thereof), as described previously.

At block 660, the system stores the additional inference and corresponding confidence indicator in the database (e.g., as previously described in relation to FIG. 2).

For simplicity, block 660 is shown in FIG. 6 to be immediately followed by block 662. However, it should be noted that in some instances, following block 660, the method 600 may return to block 658 to repeat blocks 658 to 660 (e.g., to reconcile the first inference with different additional data and/or to reconcile a different stored inference). Alternatively or additionally, following block 660, the method 600 may return to block 652 to repeat blocks 652 to 656 for one or more new NL based inputs, such that further inferences generated based on those one or more new NL based inputs are stored in the database, along with their corresponding confidence indicators.

At block 662, the system determines whether an additional NL based input has been received as part of a dialog (which may be the same dialog as block 652 or a subsequent dialog) between the user and the automated assistant. If, at an iteration of block 662, the system determines no additional NL based input has been received, then the system continues monitoring for the receipt of an additional NL based input at block 662 or, in some instances returns to a previous block such as block 652 or block 658. If, at an iteration of block 662, the system determines an additional NL based input has been received, the system proceeds to block 664.

At block 664, the system determines, based at least on a confidence indicator for the new, additional inference stored in the database, whether to process, using an LLM, the additional inference with the additional NL based input to generate an NL based response (e.g., as described with respect to the modification engine 195 of FIGS. 1 and 2). For example, the determination may be based on comparing the modified confidence indicator to a predetermined range or threshold value.

If the system determines at block 664 to process the inference with the additional NL based input, then the method 600 proceeds from block 664 to block 666. However, if the system determines at block 664 not to process the inference with the additional NL based input, then the method 600 proceeds from block 664 to block 672.

At block 666, the system modifies the additional NL based input based on the inference to generate a modified NL based input (e.g., as previously described in relation to the modification engine 195 of FIG. 2). For example, modifying the additional NL based input based on the inference to generate a modified NL based input may comprise prepending and/or postpending the inference to the additional NL based input.

At block 668, the system processes, using the LLM (e.g. an LLM stored in the ML model(s) database 115A as described with respect to FIGS. 1 and 2), the modified NL based input to generate an NL based response (e.g., as described with respect to the LLM engine 150A1 and/or 150A2 of FIGS. 1 and 2). In some implementations, and as described in relation to FIG. 2, the system also processes, using the LLM, and along with the modified NL based input, one or more contextual signals to generate the NL based response.

At block 670, the system causes the NL based response to be rendered at the client device (e.g., as described with respect to the rendering engine 112 of FIGS. 1 and 2) and/or another client device communicatively coupled to the system. In some implementations, the NL based response can be rendered for audible presentation to the user via speaker(s) of the client device. In these implementations, the system can process textual data corresponding to the NL based response (e.g., using the TTS engine 160A1 and/or 160A2) to generate synthesized speech audio data including synthesized speech that corresponds to the NL based response, and cause the synthesized speech audio data to be audibly rendered for presentation to the user of the client device via the speaker(s) of the client device. In additional or alternative implementations, the NL based response can be rendered for visual presentation to the user via a display of the client device. In some versions of these implementations, the system can cause the NL based response to be provided for visual presentation to the user in a streaming manner (e.g., as the NL based response is generated).

After block 670, the system may then return to block 652 to perform an additional iteration of the method 600 of FIG. 5 using a new NL based input (or may return to block 658 or block 662, for example).

If, however, the system determines at block 664 not to process the inference with the additional NL based input, then the method 600 proceeds from block 664 to block 672, at which the system processes, using the LLM, the additional NL based input without the inference to generate the NL based response. Put another way, the system does not modify the additional NL based input based on the inference, but instead processes the additional NL based input using the LLM without modification based on the inference. Block 672 may then be followed by block 670.

Although the method 500 of FIG. 5 and the method 600 of FIG. 6 have been described as separate methods, it should be understood that this is not meant to be limiting. For example, in some implementations, the method 500 of FIG. 5 may incorporate one or more steps of the method 600 of FIG. 6, or vice versa. In particular, it should be understood that the method 500 may in some instances also include blocks 658 and 660 of method 600. In other words, the inference reconciler described in relation to method 500 of FIG. 5 may also be used to generate a new, additional inference per block 658, which may be stored in the database per block 660. Furthermore, it should be understood that the method 600 may in some instances also include blocks 558 and 560 of method 500. In other words, the inference reconciler described in relation to method 600 of FIG. 6 may also be used to generate a modified confidence indicator for an inference per block 558, which modified confidence indicator may be stored in the database per block 560.

Furthermore, although the method 500 of FIG. 5 and the method 600 of FIG. 6 are described with respect to using an inference generator and an inference reconciler that are both separate from the LLM used to generate the NL based input, it should be understood that is for the sake of example and is not meant to be limiting. For example, in one or more alternative implementations, the LLM may perform the operations of the inference generator and/or inference reconciler, in addition to being used to generate NL based responses utilizing. That is, the LLM may be a fine-tuned LLM, and the automated assistant 115 can utilize the fine-tuned LLM to generate and store one or more inferences, reconcile the one or more inferences, and generate an NL based response based on the reconciled one or more inferences. In these implementations, the fine-tuned LLM can be fine-tuned prior to utilization by the automated assistant 115 (e.g., by training the LLM using the method 300 as described with respect to FIG. 3 and/or by training the LLM using the method 400 as described with respect to FIG. 4).

Figure 7A:
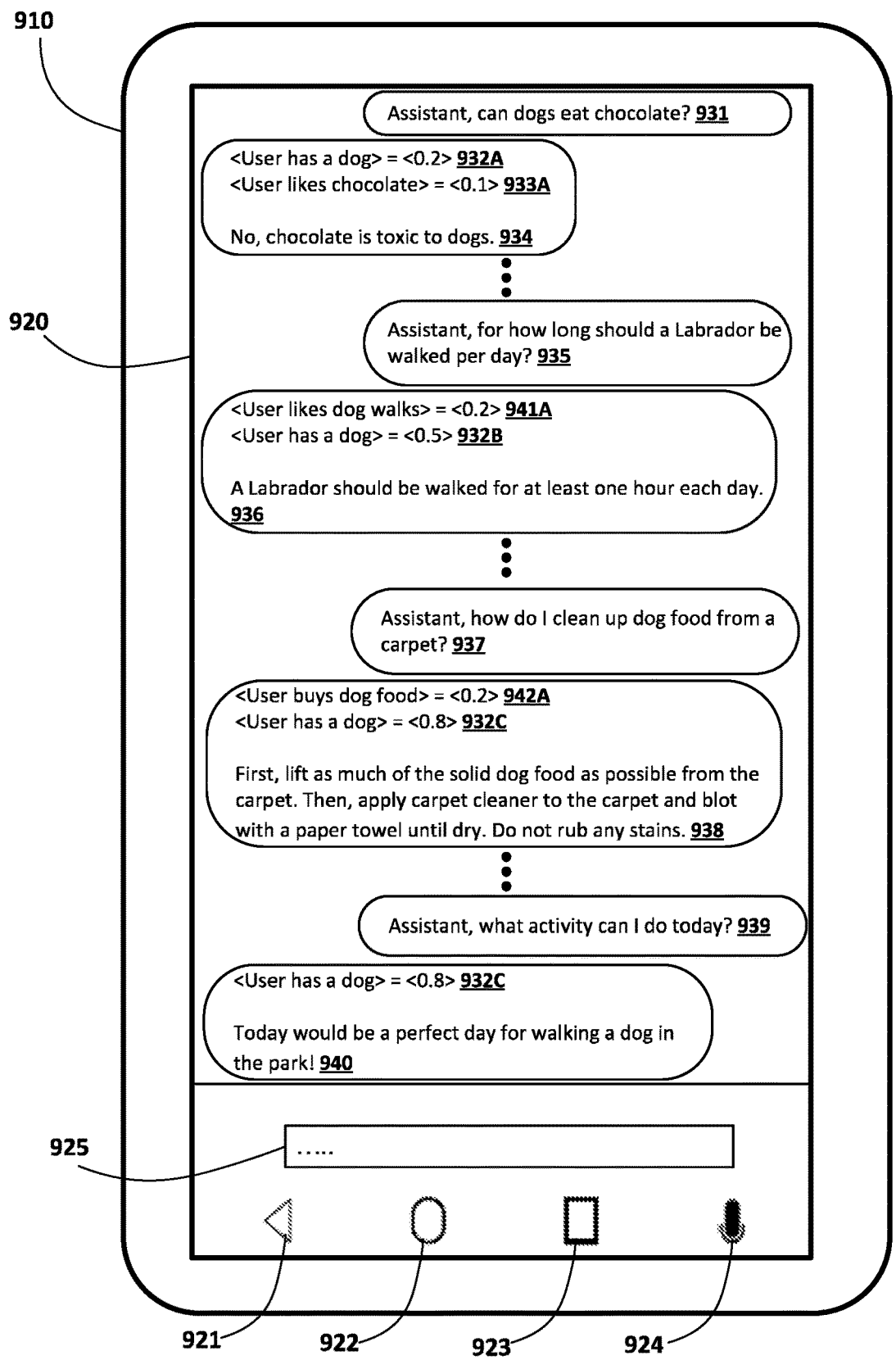
FIG. 7A, FIG. 7B, and FIG. 7C depict various non-limiting examples of dialogs between a user and an automated assistant where the automated assistant utilizes one or more inferences and a large language model (LLM) to generate an NL based response, in accordance with various implementations.
Figure 7B:
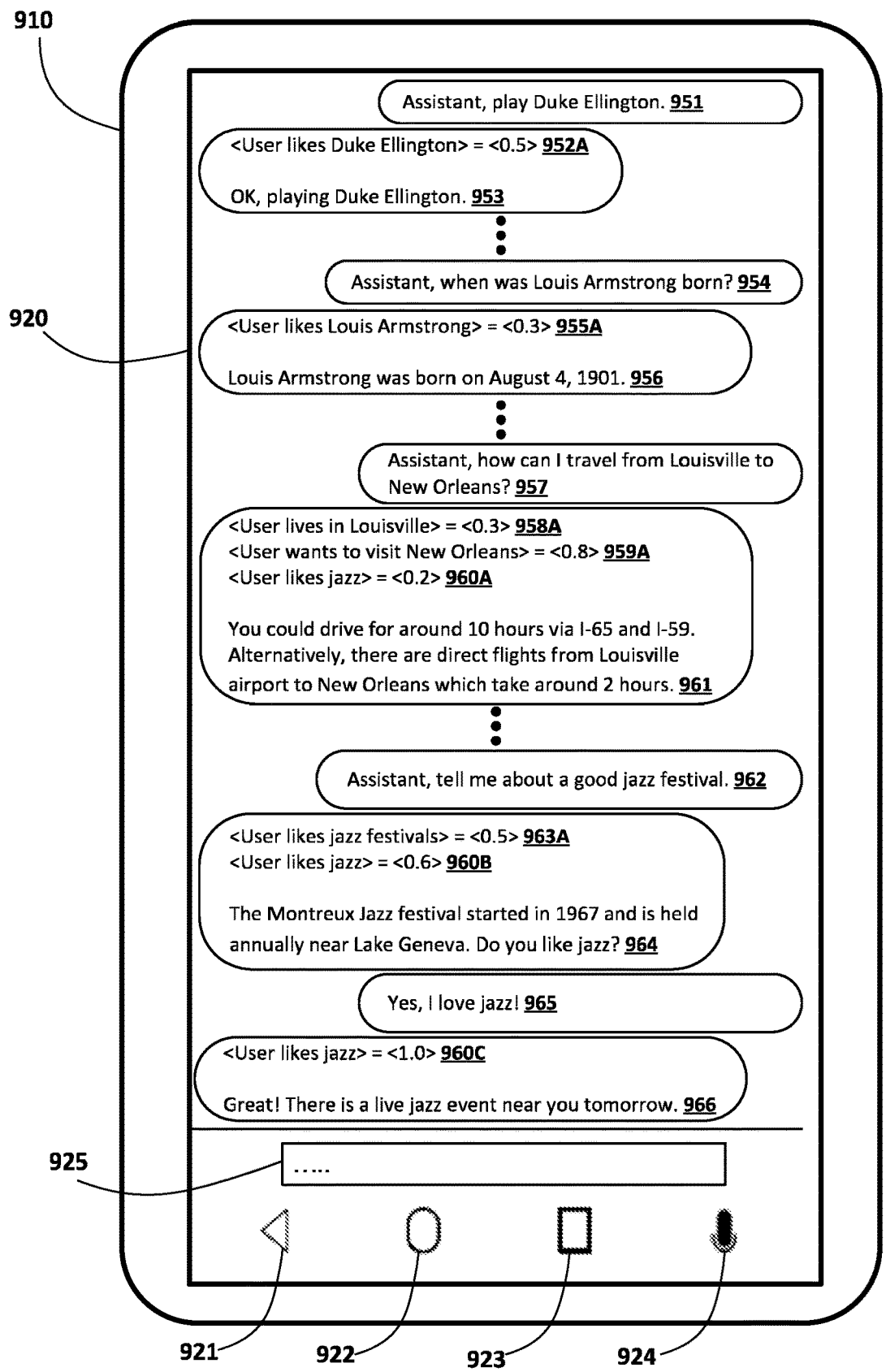
Figure 7C:
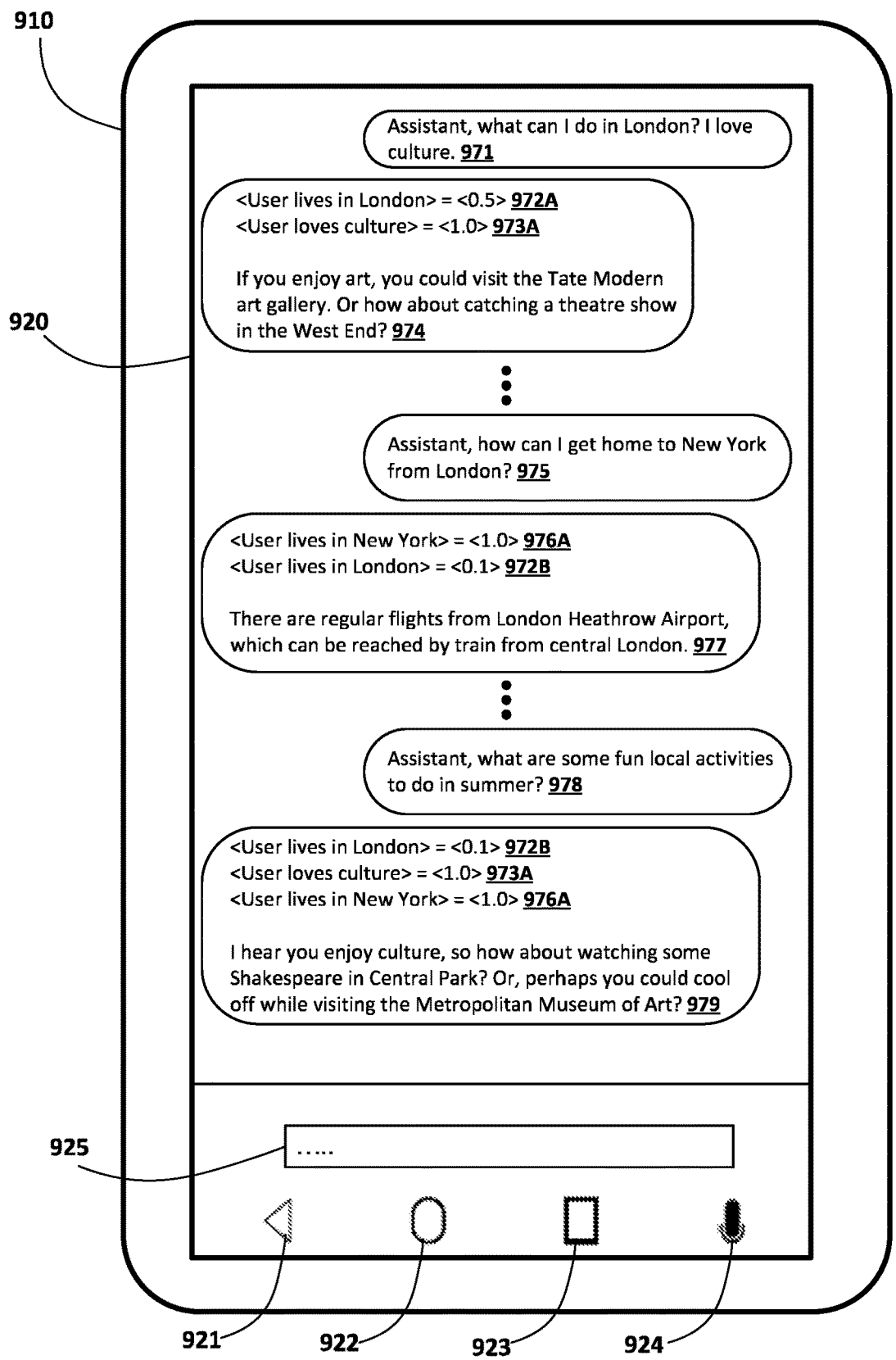

Turning now to FIGS. 7A, 7B and 7C, various non-limiting examples of dialogs between a user and an automated assistant are depicted, where the automated assistant utilizes an inference generator, an inference reconciler and an LLM in accordance with one or more implementations described herein. A client device 910 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 920 to visually render visual output. Further, the display 920 of the client device 910 can include various system interface elements 921, 922 and 923 (e.g., hardware and/or software interface elements) that may be interacted with by a user of the client device 910 to cause the client device 910 to perform one or more actions. The display 920 of the client device 910 enables the user to interact with content rendered on the display 920 by touch input (e.g., by directing user input to the display 920 or portions thereof (e.g., to a text entry box 925, to a keyboard (not depicted), or to other portions of the display 920)) and/or by spoken input (e.g., by selecting microphone interface element 924—or just by speaking without necessarily selecting the microphone interface element 924 (i.e., an automated assistant may monitor for one or more terms or phrases, gesture(s) gaze(s), mouth movement(s), lip movement(s), and/or other conditions to activate spoken input) at the client device 910). Although the client device 910 depicted in FIGS. 7A, 7B and 7C is a mobile phone, it should be understood that is for the sake of example and is not meant to be limiting. For example, the client device 910 may be a standalone speaker with a display, a standalone speaker without a display, a home automation device, an in-vehicle system, a laptop, a desktop computer, and/or any other device capable of executing an automated assistant to engage in a human-to-computer dialog with the user of the client device 910.

Referring specifically to FIG. 7A, assume that a user of the client device 910 provides NL based input 931 of "Assistant, can dogs eat chocolate?". Further assume that the automated assistant generates, based on processing the NL based input 931 using an inference generator, a first inference of "User has a dog" with a corresponding confidence score of "0.2", as indicated by 932A, and a second inference of "User likes chocolate" with a corresponding confidence score of "0.1", as indicated by 933A. In the example illustrated in FIG. 7A (and the examples illustrated in FIGS. 7B and 7C), it can be assumed that a minimum confidence score of "0.0" indicates the lowest degree of confidence that an associated inference is true (i.e., the inference is certainly false) and that a maximum confidence score of "1.0" indicates the highest degree of confidence that an associated inference is true (i.e., the inference is certainly true), with confidence scores between the minimum and maximum indicating degrees of confidence that lie between the lowest degree of confidence and the highest degree of confidence, for example on a sliding scale. For example, a confidence score of "0.5" may indicate a 'medium' degree of confidence (i.e., the inference may be true, but it is not yet a certainty). It should be noted, however, that this particular structure of confidence scores is merely provided as a non-limiting illustration and that other forms of confidence score and/or confidence indicator may be used instead.

Responsive to the NL based input 931 of "Assistant, can dogs eat chocolate?", the automated assistant has processed the NL based input 931 using an LLM to generate an NL based response 934 of "No, chocolate is toxic to dogs", which the automated assistant has caused to be rendered. The automated assistant may have decided in this instance not to modify the NL based input 931 based on the first inference 932A and the second inference 933A, for example based on the 'low' confidence scores of the first inference 932A and the second inference 933A indicating that the degrees of confidence for the first inference 932A and the second inference 933A are both low. Accordingly, in this example, the automated assistant may have processed the NL based input 931 using the LLM in lieu of generating a modified NL based input and processing the modified NL based input with the LLM to generate the NL based response. The first inference 932A and the second inference 933A have not been utilized in generating the NL based response 934, however they have been stored in a database (in association with their respected confidence scores) for possible later use.

Further assume that the user of the client device 910 provides additional NL based input 935 of "Assistant, for how long should a Labrador be walked per day?". The user may provide the additional NL based input 935 during the same dialog in which the NL based input 931 was provided, or in a subsequent dialog. The automated assistant has generated, based on processing the NL based input 935 using the inference generator, a third inference of "User likes dog walks" with a corresponding confidence score of "0.2", as indicated by 941A. The automated assistant has also generated a modified confidence score of "0.5" for the first inference 932A based on processing the first inference 932A (and optionally its respective confidence score) and additional data (in this example, the third inference 941A, and optionally its respective confidence score) using an inference reconciler. The modified confidence score of "0.5" has been stored in the database with the first inference, as indicated by 932B. The modified confidence score of "0.5" is higher than the previous confidence score of "0.2" for the first inference, indicating a greater degree of confidence that the first inference is true. This increased confidence may be the result of the user now having provided two NL based inputs (i.e. NL based input 931 and NL based input 935) that may be supportive (even if only marginally) of the first inference "User has a dog".

Responsive to the NL based input 935 of "Assistant, for how long should a Labrador be walked per day?", the automated assistant has processed the NL based input 935 using the LLM to generate an NL based response 936 of "A Labrador should be walked for at least one hour each day", which the automated assistant has caused to be rendered. The automated assistant may have decided in this instance not to modify the NL based input 935 based on the second inference 933A and the third inference 941A, for example based on the 'low' confidence scores of the second inference 933A and the third inference 941A indicating that the degrees of confidence for the second inference 933A and the third inference 941A are both low. The automated assistant may also have decided in this instance not to modify the NL based input 935 based on the first inference 932B having the modified confidence score, even though the modified confidence score indicates a greater degree of confidence that the first inference 932B is true than the previous confidence score. Accordingly, in this example, the automated assistant may have processed the NL based input 935 using the LLM in lieu of generating a modified NL based input and processing the modified NL based input with the LLM to generate the NL based response.

Assume that the user of the client device 910 now provides a further NL based input 937 of "Assistant, how do I clean up dog food from a carpet?". The user may provide the further NL based input 937 during the same dialog in which the NL based input 935 was provided, or in a subsequent dialog. The automated assistant has generated, based on processing the NL based input 937 using the inference generator, a fourth inference of "User buys dog food" with a corresponding confidence score of "0.2", as indicated by 942A. The automated assistant has also generated a modified confidence score of "0.8" for the first inference 932B based on processing the first inference 932B (and optionally its respective confidence score) and additional data (in this example, the fourth inference 942A, and optionally its respective confidence score) using the inference reconciler. The modified confidence score of "0.8" has been stored in the database with the first inference, as indicated by 932C. The modified confidence score of "0.8" is higher than the previous confidence score of "0.5" for the first inference, indicating an even greater degree of confidence that the first inference is true. This increased confidence may be the result of the user now having provided three NL based inputs (i.e. NL based input 931, NL based input 935 and NL based input 937) that may be deemed supportive of the first inference "User has a dog".

Responsive to the NL based input 937 of "Assistant, how do I clean up dog food from a carpet?", the automated assistant has processed the NL based input 937 using the LLM to generate an NL based response 938 of "First, lift as much of the solid dog food as possible from the carpet. Then, apply carpet cleaner to the carpet and blot with a paper towel until dry. Do not rub any stains", which the automated assistant has caused to be rendered. The automated assistant may have decided in this instance not to modify the NL based input 935 based on the second inference 933A, the third inference 941A or the fourth inference 942A, for example based on the 'low' confidence scores of the second inference 933A, the third inference 941A and the fourth inference 942A indicating that the degrees of confidence for the second inference 933A, the third inference 941A and the fourth inference 942A are all low. The automated assistant may have decided in this instance not to modify the NL based input 937 based on the first inference 932C having the modified confidence score, even though the modified confidence score indicates a greater degree of confidence that the first inference 932C is true than the previous confidence score. For example, the automated assistant may have decided to wait until another NL based input is received before using the first inference 932C having the modified confidence score is used.

Assume that the user of the client device 910 now provides a further NL based input 939 of "Assistant, what activity can I do today?". The user may provide the further NL based input 939 during the same dialog in which the NL based input 937 was provided, or in a subsequent dialog. Responsive to the NL based input 939 of "Assistant, what activity can I do today?", the automated assistant has determined to modify the NL based input 939 based on the first inference 932C of "User has a dog" to generate a modified NL based input, and process the modified NL based input using the LLM to generate an NL based response 940 of "Today would be a perfect day for walking a dog in the park!", which the automated assistant has caused to be rendered. The automated assistant may have decided in this instance to modify the NL based input 939 at least based on the relatively 'high' modified confidence score of the first inference 932C stored in the database. As such, the NL based input of "Assistant, what activity can I do today?" has been augmented with the first inference 932C "User has a dog" to bias the LLM to generate an NL based response 940 that is responsive to both to the NL based input 939 and the first inference 932C.

The process described in relation to FIG. 7A illustrates how one or more implementations disclosed herein may allow for an inference having a low degree of confidence (i.e., the first inference 932A) to be generated on the basis of an NL based input, with the confidence indicator for that inference being modified over time to indicate increased confidence in the inference being true as further NL based inputs are received. As such, a plurality of NL based inputs such as inputs 931, 935 and 937 which, when processed individually, may have resulted in inferences being generated with low confidence, can instead be used to generate over time an inference having a high degree of confidence, due to the cumulative influence of the NL based inputs. The process described in relation to FIG. 7A also illustrates how a confidence score associated with an inference can be used to determine whether the inference should be used to modify an NL based input for generating an NL based response. While the confidence score indicates a low degree of confidence that the inference is true, the automated assistant may decide not to generate a modified NL based input based on the inference. However, once the confidence score has been modified over time to indicate a relatively high degree of confidence that the inference is true, the automated assistant may decide to generate a modified NL based input based on the inference. As such, by preventing an inference having a low confidence score from being used to generate an NL based response, implementations may serve to reduce the number of follow-up NL based inputs that may be received by an LLM. Although any given user may decide to provide a follow-up NL based input, any "on average" reduction in the number of follow-up NL based inputs can be hugely beneficial in terms of computational resource usage.

Now referring specifically to FIG. 7B, assume that a user of the client device 910 provides NL based input 951 of "Assistant, play Duke Ellington". Further, assume that the automated assistant generates, based on processing the NL based input 951 using an inference generator, a first inference of "User like Duke Ellington" with a corresponding confidence score of "0.5", as indicated by 952A, wherein the first inference 952A and associated confidence score are stored in a database. The automated assistant has processed the NL based input 951, using an LLM, and optionally with the first inference 952A and/or one or more other inferences stored in the database), to generate an NL based response 953 of "OK, playing Duke Ellington", for rendering at the display 920. The automated assistant may also cause a task to be fulfilled based on the NL based input 951 and/or NL based output 953, such initiating playback of a song by Duke Ellington using a media application.

Assume that the user of the client device 910 provides additional NL based input 954 of "Assistant, when was Louis Armstrong born?". The user may provide the additional NL based input 954 during the same dialog in which the NL based input 951 was provided, or in a subsequent dialog. The automated assistant has generated, based on processing the NL based input 954 using the inference generator, a second inference of "User likes Louis Armstrong" with a corresponding confidence score of "0.3", as indicated by 955A, and stored the second inference 955A and associated confidence score in the database.

Responsive to the NL based input 954 of "Assistant, when was Louis Armstrong born?", the automated assistant has processed the NL based input 954 using the LLM to generate an NL based response 956 of "Louis Armstrong was born on Aug. 4, 1901", which the automated assistant has caused to be rendered. The automated assistant may have decided in this instance not to modify the NL based input 954 based on the first inference 952A or the second inference 955A, for example based on the relatively 'low' confidence scores of the first inference 952A or the second inference 955A indicating that the degrees of confidence for the first inference 952A or the second inference 955A are both relatively low. Accordingly, in this example, the automated assistant may have processed the NL based input 954 using the LLM in lieu of generating a modified NL based input and processing the modified NL based input with the LLM to generate the NL based response 956.

Assume that the user of the client device 910 now provides a further NL based input 957 of "Assistant, how can I travel from Louisville to New Orleans?". The user may provide the further NL based input 957 during the same dialog in which the NL based input 954 was provided, or in a subsequent dialog. The automated assistant has generated, based on processing the NL based input 957 using the inference generator, a third inference of "User lives in Louisville" with a corresponding confidence score of "0.3", as indicated by 958A, and a fourth inference of "User wants to visit New Orleans" with a corresponding confidence score of "0.8", as indicated by 959A, and stored the third inference 958A the fourth inference 959A in the database with their associated confidence scores.

The automated assistant has also generated a fifth inference of "User likes jazz" having an associated confidence score "0.2", as indicated by 960A, and stored the fifth inference 960A and associated confidence score in the database. However, rather than generating the fifth inference 960A and associate confidence score based solely on processing the NL based input 957 (or a previous NL based input 951, 954) using the inference generator, the automated assistant has instead generated the fifth inference 960A and associate confidence score using the inference reconciler, by processing two or more of the inferences stored in the database using the inference reconciler to generate the fifth inference 960A and associated confidence score. For example, the inference reconciler may have processed two or more of the first inference 952A, the second inference 955A and the fourth inference 959A (and optionally their associated confidence scores) to generate the fifth inference 960A and associated confidence score. For instance, the inference reconciler may have processed the first inference 952A of "User likes Duke Ellington" with the second inference 955A of "User likes Louis Armstrong" and the fourth inference 959A of "User wants to visit New Orleans" (and optionally their associated confidence scores) to generate the fifth inference 960A of "User likes jazz" and its associated confidence score.

Responsive to the NL based input 957 of "Assistant, how can I travel from Louisville to New Orleans?", the automated assistant has processed the NL based input 957 using the LLM to generate an NL based response 961 of "You could drive for around 10 hours via 1-65 and 1-59. Alternatively, there are direct flights from Louisville airport to New Orleans which take around 2 hours", which the automated assistant has caused to be rendered. The automated assistant may have decided in this instance to modify the NL based input 957 based on the fourth inference 959A of "User wants to visit New Orleans" at least based on its relatively high associated confidence score, but not based on the first inference 952A, the second inference 955A or the third inference 958A, for example due to their relatively low respective confidence scores. The automated assistant may therefore have generated a modified NL based input based on the NL based input 957 and the fourth inference 959A, and processed the modified NL based input using the LLM to generate the NL based response 961.

Assume that the user of the client device 910 now provides a further NL based input 962 of "Assistant, tell me about a good jazz festival". The user may provide the further NL based input 962 during the same dialog in which the NL based input 957 was provided, or in a subsequent dialog. Responsive to the NL based input 962 of "Assistant, tell me about a good jazz festival", the automated assistant has processed the NL based input 962 using the inference generator to generate a sixth inference of "User likes jazz festivals" having an associated confidence score of "0.5", as indicated by 963A, and stored the sixth inference 963A and associated confidence score in the database. The automated assistant has processed, using the inference reconciler, the fifth inference 960A of "User likes jazz" (optionally with its associated confidence score) with the first inference 952A, the second inference 955A, third inference 958A, fourth inference 959A and sixth inference 963A (and optionally their associated confidence scores) to generate a modified confidence score for the fifth inference of "0.6", as indicated by 960B, and stored the modified confidence score in the database with the fifth inference. The modified confidence score therefore indicates that the degree of confidence that the fifth inference is true has increased.

Based on a determination that the fifth inference 960B now has a modified confidence score indicating a 'medium' degree of confidence that the fifth inference 960B is true rather than a relatively 'low' degree of confidence (e.g. by comparing the modified confidence score to a predetermined threshold value or range of values), the automated assistant may modify the NL based input 962 based on the fifth inference 960B of "User likes jazz" to generate a modified NL based input that, when processed using the LLM, will cause the LLM to generate an NL based response 964 that prompts the user to provide a follow-up NL based input to clarify whether the fifth inference is true. Therefore, the automated assistant has caused an NL based response 964 of "The Montreux Jazz festival started in 1967 and is held annually near Lake Geneva. Do you like jazz?" to be generated and rendered, wherein the NL based response 964 is responsive to the NL based input 962, but also prompts the user to provide a follow-up NL based input to assist the automated assistant in clarifying whether the fifth inference 960B of "User likes jazz" is true.

Assume that the user of the client device 910 now provides a follow-up NL based input 965 of "Yes, I love jazz!", in response to the prompt for clarification provided in the NL based response 964. The automated assistant has processed, using the inference reconciler, the fifth inference 960B (optionally with its corresponding confidence score) and additional data (for example the follow-up NL based input 965 and/or an additional inference generated by processing the follow-up NL based input 965 with the inference generator) to generate a modified confidence score for the fifth inference of "1.0", as indicated by 960C, with this confidence score indicating that the fifth inference 960C may now be considered a fact. The fifth inference 960C and modified confidence score are stored in the database. The automated assistant may process the follow-up NL based input 965 with the fifth inference 960 using the LLM (for example by modifying the NL based input 965 based on the fifth inference 960C) to generate and render an NL based output 966 of "Great! There is a live jazz event near you tomorrow."

The process described in relation to FIG. 7B illustrates how one or more implementations disclosed herein (particularly where the inference reconciler is an LLM) can allow for a new, additional inference (i.e. the fifth inference 960A of "User likes jazz") to be generated based on multiple previously-generated inferences which, at least superficially, may appear to be disparate.

Now referring specifically to FIG. 7C, assume that a user of the client device 910 provides NL based input 971 of "Assistant, what can I do in London? I love culture". Further, assume that the automated assistant generates, based on processing the NL based input 971 using an inference generator, a first inference of "User lives in London" with a corresponding confidence score of "0.5", as indicated by 972A, and a second inference of "User loves culture" with a corresponding confidence score of "1.0", as indicated by 973A, wherein the first inference 972A, the second inference 973A and their associated confidence scores are stored in a database. The confidence score for the first inference 972A indicates a 'medium' degree of confidence that the user lives in London, while the confidence score for the second inference 973A indicates a 'high' degree of confidence that the user loves culture.

The automated assistant has also processed the NL based input 971, using an LLM, and optionally with the first inference 972A, the second inference 973A and/or one or more other inferences stored in the database), to generate an NL based response 974 of "If you enjoy art, you could visit the Tate Modern art gallery. Or how about catching a theatre show in the West End?", for rendering at the display 920.

Assume that the user of the client device 910 provides additional NL based input 975 of "Assistant, how can I get home to New York from London?". The user may provide the additional NL based input 975 during the same dialog in which the NL based input 971 was provided, or in a subsequent dialog. The automated assistant has generated, based on processing the NL based input 975 using the inference generator, a third inference of "User lives in New York" with a corresponding confidence score of "1.0", as indicated by 976A, and stored the third inference 976A and associated confidence score in the database. The confidence score for the third inference 976A indicates a 'high' degree of confidence that the user lives in New York.

The automated assistant has also processed, using an inference reconciler, the first inference 972A of "User lives in London" (and optionally its corresponding confidence score) with the third inference 976A of "User lives in New York" (and optionally its corresponding confidence score) or the NL based input 975 (or a portion or embedding thereof) to generate a modified confidence score of "0.1" for the first inference, as indicated by 972B. The modified confidence score has been stored in the database in association with the first inference 972B. The modified confidence score of "0.1" for the first inference 972B is lower than the previous confidence score of "0.5" for the first inference 972A, indicating that the degree of confidence that the user lives in London is now lower after receiving the recent NL based input 975, for example because information provided in the NL based input (e.g. the user refers to New York as their 'home') appears to contradict the first inference 976A (the "User lives in London").

The automated assistant processes the NL based input 975 using the LLM, in some examples modified based on the third inference 976A of "User lives in New York" due to its 'high' corresponding confidence score, to generate and render an NL based output 977 of "There are regular flights from London Heathrow Airport, which can be reached by train from central London."

Assume that the user of the client device 910 now provides a further NL based input 978 of "Assistant, what are some fun local activities to do in summer?". The user may provide the further NL based input 978 during the same dialog in which the NL based input 975 was provided, or in a subsequent dialog. The automated assistant may have decided in this instance to modify the NL based input 978 based on the second inference 973A of "User likes culture" and the third inference 976A of "User lives in New York" based on their relatively high associated confidence scores, but not to modify the NL based input 978 based on the first inference 972B, for example based on its relatively low respective confidence score. The automated assistant may therefore have generated a modified NL based input based on the NL based input 978, the second inference 973A and the third inference 976A, and processed the modified NL based input using the LLM to generate the NL based response 979 of "I hear you enjoy culture, so how about watching some Shakespeare in Central Park? Or, perhaps you could cool off while visiting the Metropolitan Museum of Art?".

The process described in relation to FIG. 7C illustrates how, in accordance with one or more implementations, the confidence indicator of an inference (i.e. first inference 972A) can be updated over time to reflect a fall in the degree of confidence that the inference is true as new information is provided to the automated assistant. For instance, information contained within an NL based input provided to the automated assistant that appears to contradict a previously-generated inference can be utilized to modify a confidence score of that previously-generated inference such that it indicates a lower degree of confidence that the previously-generated inference is true. As a result of the modified confidence score indicating a decreased degree of confidence, the inference may be prevented from being used to augment the generation of an NL based response(s) using an LLM, reducing the likelihood of an undesired NL based response being generated and therefore a follow-up NL based input being provided by a user.

Although FIGS. 7A, 7B and 7C show various inferences and corresponding confidence scores appearing to be rendered on the display 920, it should be understood that this is merely for ease of understanding and that the inferences and/or confidence scores may not actually be rendered.

Figure 8:
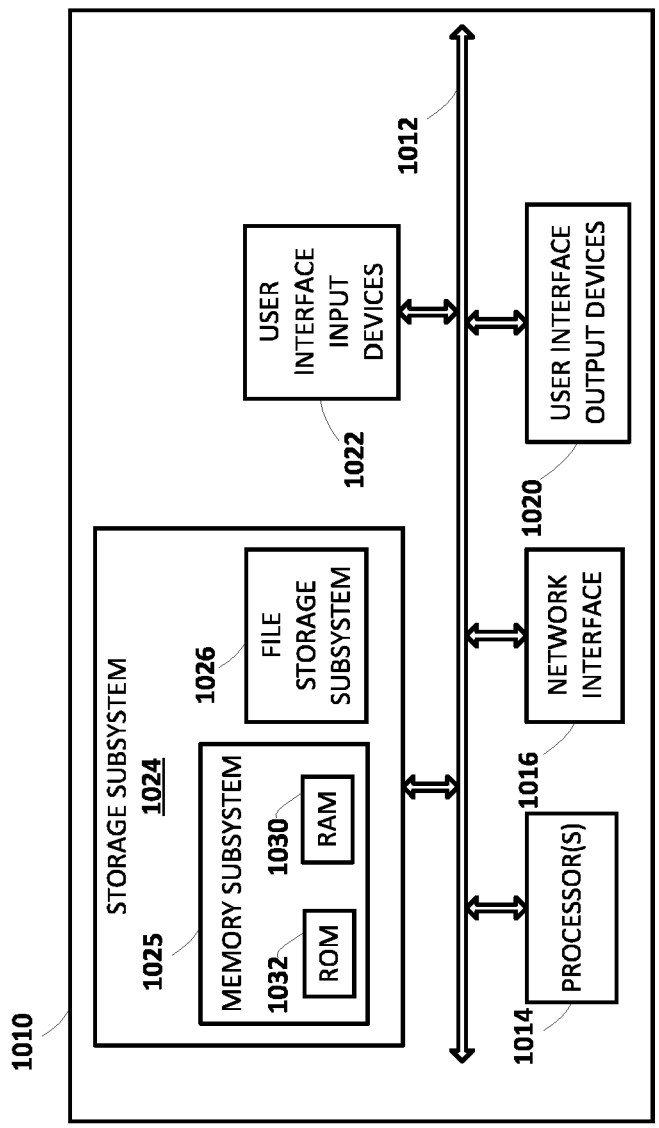
FIG. 8 depicts an example architecture of a computing device, in accordance with various implementations.

Turning now to FIG. 8, a block diagram of an example computing device 1010 that may optionally be utilized to perform one or more aspects of techniques described herein is depicted. In some implementations, one or more of a client device, cloud-based automated assistant component(s), and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the methods disclosed herein, as well as to implement various components depicted in FIGS. 1 and 2.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem 1012 may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 8 is intended only as a specific example for purposes of illustrating some implementations. Many other configurations of computing device 1010 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving a first natural language (NL) based input as part of a dialog between a user of a client device and an automated assistant that is accessible at the client device; processing, using a first machine learning (ML) model, the first NL based input to generate a first inference associated with the user and a confidence indicator for the first inference, the confidence indicator for the first inference indicative of a degree of confidence that the first inference is true; storing the first inference and the confidence indicator for the first inference in a database; processing, using a second ML model, the first inference and additional data to generate a modified confidence indicator for the first inference, the modified confidence indicator for the first inference being indicative of a degree of confidence that the first inference is true based on the first inference and the additional data; storing the modified confidence indicator for the first inference in the database in association with the first inference; and determining, based at least on the modified confidence indicator for the first inference stored in the database, whether to process, using a first large language model (LLM), the first inference with a second NL based input to generate a first NL based response.

These and other implementations of technology disclosed herein can optionally include one or more of the following features.

In some implementations, the method can further comprise: receiving the second NL based input as part of a dialog between the user of the client device and the automated assistant; responsive to determining, based at least on the modified confidence indicator for the first inference, to process, using the first LLM, the first inference with the second NL based input to generate the first NL based response: modifying the second NL based input based on the first inference to generate a modified second NL based input; processing, using the first LLM, the modified second NL based input to generate the first NL based response; and causing the first NL based response to be rendered at the client device.

In some versions of those implementations, modifying the second NL based input based on the first inference to generate a modified second NL based input may comprise prepending or postpending the first inference to the second NL based input.

In additional or alternative versions of those implementations, causing the first NL based response to be rendered at the client device comprises causing the first NL based response to be visually rendered at the client device via a display of the client device and/or comprises causing the first NL based response to be audibly rendered at the client device via one or more speakers of the client device.

In additional or alternative versions of those implementations, causing the first NL based response to be rendered at the client device comprises transmitting data to the client device that is operable for causing the client device to render the NL based response.

In some implementations, the method further comprises: receiving the second NL based input as part of a dialog between the user of the client device and the automated assistant; responsive to determining, based at least on the modified confidence indicator for the first inference stored in the database, not to process, using the first LLM, the first inference with the second NL based input to generate a first NL based response: processing, using the first LLM, the second NL based input without the first inference to generate the first NL based response; and causing the first NL based response to be rendered at the client device.

In some implementations, the method further comprises: processing, using the first ML model, a third NL based input to generate a second inference associated with the user and a confidence indicator for the second inference, the confidence indicator for the second inference indicative of a degree of confidence that the second inference is true; and storing the second inference and the confidence indicator for the second inference in the database, wherein the additional data comprises the second inference.

In some versions of those implementations, the method further comprises: receiving a fourth NL based input as part of a dialog between the user of the client device and the automated assistant; processing, using the first ML model, the fourth NL based input to generate a third inference associated with the user (and, optionally, a confidence indicator for the third inference, the confidence indicator for the third inference indicative of a degree of confidence that the third inference is true); storing the third inference (and the confidence indicator for the third inference if generated) in the database; processing, using the second ML model, the first inference, the modified confidence indicator for the first inference and the third inference to generate a further modified confidence indicator for the first inference, the further modified confidence indicator for the first inference being indicative of a degree of confidence that the first inference is true based on the first inference, the modified confidence indicator for the first inference and the third inference; storing the further modified confidence indicator for the first inference in the database in association with the first inference; receiving a fifth NL based input as part of a dialog between the user of the client device and the automated assistant; responsive to determining, based at least on the further modified confidence indicator for the first inference, to process, using the first LLM, the first inference with the fifth NL based input to generate a second NL based response: modifying the fifth NL based input based on the first inference to generate a modified fifth NL based input; processing, using the first LLM, the modified fifth NL based input to generate the second NL based response; and causing the second NL based response to be rendered at the client device.

In some implementations, the method further comprises: receiving a third NL based input as part of a dialog between the user of the client device and the automated assistant; and storing the third NL based input, wherein the additional data comprises at least a portion of the third NL based input.

In some implementations, the method further comprises: obtaining one or more contextual signals associated with one or more of: a dialog between the user of the client device and the automated assistant, the user of the client device, or the client device; and determining, based on the one or more contextual signals, a current context, wherein the additional data comprises the current context.

In some implementations, the method further comprises: obtaining one or more contextual signals associated with one or more of: the user of the client device, or the client device, wherein the additional data comprises the one or more contextual signals.

In some implementations, the second ML model is a second LLM, and wherein processing, using the second ML model, the first inference and the additional data to generate a modified confidence indicator for the first inference comprises: providing the first inference and the additional data to the second LLM in an LLM prompt; and receiving the modified confidence indicator for the first inference as an LLM output.

In some implementations, a method implemented by one or more processors, the method comprising: receiving a first natural language (NL) based input as part of a dialog between a user of a client device and an automated assistant that is accessible at the client device; processing, using a first machine learning (ML) model, the first NL based input to generate a first inference associated with the user; storing the first inference in a database; processing, using a second ML model, the first inference and additional data to generate the second inference associated with the user and a confidence indicator for the second inference, the confidence indicator for the second inference being indicative of a degree of confidence that the second inference is true based on the first inference and the additional data; storing the second inference in the database in association with the confidence indicator for the second inference; and determining, based at least on the confidence indicator for the second inference, whether to process, using a first large language model (LLM), the second inference with a second NL based input to generate a first NL based response.

These and other implementations of technology disclosed herein can optionally include one or more of the following features.

In some implementations, the method further comprises: receiving the second NL based input as part of a dialog between the user of the client device and the automated assistant; responsive to determining, based at least on the confidence indicator for the second inference, to process, using the first LLM, the second inference with the second NL based input to generate a first NL based response: modifying the second NL based input based on the second inference to generate a modified second NL based input; processing, using the first LLM, the modified second NL based input to generate the first NL based response; and causing the first NL based response to be rendered at the client device.

In some versions of those implementations, modifying the second NL based input based on the second inference to generate a modified second NL based input comprises prepending or postpending the second inference to the second NL based input.

In additional or alternative versions of those implementations, causing the first NL based response to be rendered at the client device comprises causing the first NL based response to be visually rendered at the client device via a display of the client device and/or comprises causing the first NL based response to be audibly rendered at the client device via one or more speakers of the client device.

In additional or alternative versions of those implementations, causing the first NL based response to be rendered at the client device comprises transmitting data to the client device that is operable for causing the client device to render the NL based response.

In some implementations, the method further comprises: receiving the second NL based input as part of a dialog between the user of the client device and the automated assistant; responsive to determining, based at least on the confidence indicator for the second inference stored in the database, not to process, using the first LLM, the second inference with the second NL based input to generate a first NL based response: processing, using the first LLM, the second NL based input without the second inference to generate the first NL based response; and causing the first NL based response to be rendered at the client device.

In some implementations, the method further comprises: processing, using the first ML model, a third NL based input to generate a third inference associated with the user and a confidence indicator for the third inference, the confidence indicator for the third inference indicative of a degree of confidence that the third inference is true; and storing the third inference and the confidence indicator for the third inference in the database, wherein the additional data comprises the third inference.

In some versions of those implementations, the method further comprises: receiving a fourth NL based input as part of a dialog between the user of the client device and the automated assistant; processing, using the first ML model, the fourth NL based input to generate a fourth inference associated with the user and a confidence indicator for the fourth inference, the confidence indicator for the fourth inference indicative of a degree of confidence that the fourth inference is true; storing the fourth inference and the confidence indicator for the fourth inference in the database; processing, using the second ML model, the second inference and the fourth inference to generate a fifth inference and confidence indicator for the fifth inference, the confidence indicator for the fifth inference being indicative of a degree of confidence that the fifth inference is true based on the second inference and the fourth inference; storing the fifth inference and the confidence indicator for the fifth inference in the database; receiving a fifth NL based input as part of a dialog between the user of the client device and the automated assistant; responsive to determining, based at least on the confidence indicator for the fifth inference, to process, using the first LLM, the fifth inference with the fifth NL based input to generate a second NL based response: modifying the fifth NL based input based on the first inference to generate a modified fifth NL based input; processing, using the first LLM, the modified fifth NL based input to generate the second NL based response; and causing the second NL based response to be rendered at the client device.

In some implementations, the method further comprises: receiving a third NL based input as part of a dialog between the user of the client device and the automated assistant; and
storing the third NL based input, wherein the additional data comprises at least a portion of the third NL based input.

In some implementations, the method further comprises: obtaining one or more contextual signals associated with one or more of: a dialog between the user of the client device and the automated assistant, the user of the client device, or the client device; and determining, based on the one or more contextual signals, a current context, wherein the additional data comprises the current context.

In some implementations, the method further comprises: obtaining one or more contextual signals associated with one or more of: the user of the client device, or the client device, wherein the additional data comprises the one or more contextual signals.

In some implementations, the second ML model is a second LLM, and processing, using the second ML model, the first inference and the additional data to generate a second inference associated with the user and a confidence indicator for the second inference comprises: providing the first inference and the additional data to the second LLM in an LLM prompt; and receiving the second inference associated with the user and a confidence indicator for the second inference as an LLM output.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
  receiving a first natural language (NL) based input as part of a dialog between a user of a client device and an automated assistant that is accessible at the client device;
  processing, using a first machine learning (ML) model, the first NL based input to generate a first inference associated with the user and a confidence indicator for the first inference, the confidence indicator for the first inference indicative of a degree of confidence that the first inference is true;
  storing the first inference and the confidence indicator for the first inference in a database;
  processing, using a second ML model, the first inference and additional data to generate a modified confidence indicator for the first inference, the modified confidence indicator for the first inference being indicative of a degree of confidence that the first inference is true based on the first inference and the additional data;
  storing the modified confidence indicator for the first inference in the database in association with the first inference; and
  determining, based at least on the modified confidence indicator for the first inference stored in the database, whether to process, using a first large language model (LLM), the first inference with a second NL based input to generate a first NL based response.

2. The method of claim 1, further comprising:
  receiving the second NL based input as part of a dialog between the user of the client device and the automated assistant;
  responsive to determining, based at least on the modified confidence indicator for the first inference, to process, using the first LLM, the first inference with the second NL based input to generate the first NL based response:
    modifying the second NL based input based on the first inference to generate a modified second NL based input;
  processing, using the first LLM, the modified second NL based input to generate the first NL based response; and
  causing the first NL based response to be rendered at the client device.

3. The method of claim 2, wherein modifying the second NL based input based on the first inference to generate a modified second NL based input comprises prepending or postpending the first inference to the second NL based input.

4. The method of claim 2, wherein causing the first NL based response to be rendered at the client device comprises causing the first NL based response to be visually rendered at the client device via a display of the client device and/or comprises causing the first NL based response to be audibly rendered at the client device via one or more speakers of the client device.

5. The method of claim 2, wherein causing the first NL based response to be rendered at the client device comprises transmitting data to the client device that is operable for causing the client device to render the first NL based response.

6. The method of claim 1, further comprising:
  receiving the second NL based input as part of a dialog between the user of the client device and the automated assistant;
  responsive to determining, based at least on the modified confidence indicator for the first inference stored in the database, not to process, using the first LLM, the first inference with the second NL based input to generate a first NL based response:
    processing, using the first LLM, the second NL based input without the first inference to generate the first NL based response; and
  causing the first NL based response to be rendered at the client device.

7. The method of claim 1, further comprising:
  processing, using the first ML model, a third NL based input to generate a second inference associated with the user and a confidence indicator for the second inference, the confidence indicator for the second inference indicative of a degree of confidence that the second inference is true; and
  storing the second inference and the confidence indicator for the second inference in the database,
  wherein the additional data comprises the second inference.

8. The method of claim 7, further comprising:
  receiving a fourth NL based input as part of a dialog between the user of the client device and the automated assistant;
  processing, using the first ML model, the fourth NL based input to generate a third inference associated with the user;
  storing the third inference in the database;
  processing, using the second ML model, the first inference, the modified confidence indicator for the first inference and the third inference to generate a further modified confidence indicator for the first inference, the further modified confidence indicator for the first inference being indicative of a degree of confidence that the first inference is true based on the first inference, the modified confidence indicator for the first inference and the third inference;

storing the further modified confidence indicator for the first inference in the database in association with the first inference;

receiving a fifth NL based input as part of a dialog between the user of the client device and the automated assistant;

responsive to determining, based at least on the further modified confidence indicator for the first inference, to process, using the first LLM, the first inference with the fifth NL based input to generate a second NL based response:

modifying the fifth NL based input based on the first inference to generate a modified fifth NL based input;

processing, using the first LLM, the modified fifth NL based input to generate the second NL based response; and causing the second NL based response to be rendered at the client device.

9. The method of claim 1, further comprising:
receiving a third NL based input as part of a dialog between the user of the client device and the automated assistant; and
storing the third NL based input,
wherein the additional data comprises at least a portion of the third NL based input.

10. The method of claim 1, further comprising:
obtaining one or more contextual signals associated with one or more of: a dialog between the user of the client device and the automated assistant, the user of the client device, or the client device; and
determining, based on the one or more contextual signals, a current context,
wherein the additional data comprises the current context.

11. The method of claim 1, further comprising:
obtaining one or more contextual signals associated with one or more of: the user of the client device, or the client device,
wherein the additional data comprises the one or more contextual signals.

12. The method of claim 1, wherein the second ML model is a second LLM, and wherein processing, using the second ML model, the first inference and the additional data to generate a modified confidence indicator for the first inference comprises:
providing the first inference and the additional data to the second LLM in an LLM prompt; and
receiving the modified confidence indicator for the first inference as an LLM output.

13. A method implemented by one or more processors, the method comprising:
receiving a first natural language (NL) based input as part of a dialog between a user of a client device and an automated assistant that is accessible at the client device;
processing, using a first machine learning (ML) model, the first NL based input to generate a first inference associated with the user;
storing the first inference in a database;
processing, using a second ML model, the first inference and additional data to generate the second inference associated with the user and a confidence indicator for the second inference, the confidence indicator for the second inference being indicative of a degree of confidence that the second inference is true based on the first inference and the additional data;

storing the second inference in the database in association with the confidence indicator for the second inference; and determining, based at least on the confidence indicator for the second inference, whether to process, using a first large language model (LLM), the second inference with a second NL based input to generate a first NL based response.

14. The method of claim 13, further comprising:
receiving the second NL based input as part of a dialog between the user of the client device and the automated assistant;

responsive to determining, based at least on the confidence indicator for the second inference, to process, using the first LLM, the second inference with the second NL based input to generate a first NL based response:

modifying the second NL based input based on the second inference to generate a modified second NL based input;

processing, using the first LLM, the modified second NL based input to generate the first NL based response; and causing the first NL based response to be rendered at the client device.

15. The method of claim 14, wherein modifying the second NL based input based on the second inference to generate a modified second NL based input comprises prepending or postpending the second inference to the second NL based input.

16. The method of claim 13, further comprising:
receiving the second NL based input as part of a dialog between the user of the client device and the automated assistant;

responsive to determining, based at least on the confidence indicator for the second inference stored in the database, not to process, using the first LLM, the second inference with the second NL based input to generate a first NL based response:

processing, using the first LLM, the second NL based input without the second inference to generate the first NL based response; and causing the first NL based response to be rendered at the client device.

17. The method of claim 13, further comprising:
processing, using the first ML model, a third NL based input to generate a third inference associated with the user and a confidence indicator for the third inference, the confidence indicator for the third inference indicative of a degree of confidence that the third inference is true; and storing the third inference and the confidence indicator for the third inference in the database,
wherein the additional data comprises the third inference.

18. The method of claim 17, further comprising:
receiving a fourth NL based input as part of a dialog between the user of the client device and the automated assistant;

processing, using the first ML model, the fourth NL based input to generate a fourth inference associated with the user and a confidence indicator for the fourth inference, the confidence indicator for the fourth inference indicative of a degree of confidence that the fourth inference is true;

storing the fourth inference and the confidence indicator for the fourth inference in the database;

processing, using the second ML model, the second inference and the fourth inference to generate a fifth inference and confidence indicator for the fifth inference, the confidence indicator for the fifth inference being indicative of a degree of confidence that the fifth inference is true based on the second inference and the fourth inference;

storing the fifth inference and the confidence indicator for the fifth inference in the database;

receiving a fifth NL based input as part of a dialog between the user of the client device and the automated assistant;

responsive to determining, based at least on the confidence indicator for the fifth inference, to process, using the first LLM, the fifth inference with the fifth NL based input to generate a second NL based response:
  modifying the fifth NL based input based on the first inference to generate a modified fifth NL based input;
  processing, using the first LLM, the modified fifth NL based input to generate the second NL based response; and
  causing the second NL based response to be rendered at the client device.

19. The method of claim 13, further comprising:
receiving a third NL based input as part of a dialog between the user of the client device and the automated assistant; and
storing the third NL based input,
wherein the additional data comprises at least a portion of the third NL based input.

20. The method of claim 13, wherein the second ML model is a second LLM, and wherein processing, using the second ML model, the first inference and the additional data to generate a second inference associated with the user and a confidence indicator for the second inference comprises:
providing the first inference and the additional data to the second LLM in an LLM prompt; and
receiving the second inference associated with the user and a confidence indicator for the second inference as an LLM output.

* * * * *